(12) United States Patent
Davis

(10) Patent No.: US 6,886,005 B2
(45) Date of Patent: Apr. 26, 2005

(54) RDL SEARCH ENGINE

(75) Inventor: Russell T. Davis, Bethesda, MD (US)

(73) Assignee: e-Numerate Solutions, Inc., McLean, VA (US)

( * ) Notice: Subject to any disclaimer, the term of this patent is extended or adjusted under 35 U.S.C. 154(b) by 198 days.

(21) Appl. No.: 09/784,205

(22) Filed: Feb. 16, 2001

(65) Prior Publication Data

US 2002/0073115 A1 Jun. 13, 2002

Related U.S. Application Data

(60) Provisional application No. 60/183,152, filed on Feb. 17, 2000.

(51) Int. Cl.$^7$ .............................................. G06F 17/30
(52) U.S. Cl. ..................... 707/2; 707/3; 707/4; 707/5; 707/10; 709/201; 709/203; 715/513
(58) Field of Search .............................. 707/3, 10, 5, 4, 707/2; 709/201, 203; 715/513

(56) References Cited

U.S. PATENT DOCUMENTS

| | | | | |
|---|---|---|---|---|
| 5,423,032 A | * | 6/1995 | Byrd et al. ..................... | 707/5 |
| 5,737,592 A | | 4/1998 | Nguyen et al. | |
| 5,838,965 A | | 11/1998 | Kavanagh et al. | |
| 5,999,944 A | | 12/1999 | Lipkin | |
| 6,014,661 A | | 1/2000 | Ahlberg et al. ................ | 707/3 |
| 6,173,284 B1 | * | 1/2001 | Brown ......................... | 707/10 |
| 6,206,388 B1 | * | 3/2001 | Ouboter .......................... | 707/1 |
| 6,243,698 B1 | * | 6/2001 | Powers et al. ................. | 707/2 |
| 6,317,750 B1 | | 11/2001 | Tortolani et al. | |
| 6,349,307 B1 | * | 2/2002 | Chen ......................... | 707/103 |
| 6,366,915 B1 | * | 4/2002 | Rubert et al. ................. | 707/10 |
| 6,370,549 B1 | * | 4/2002 | Saxton ........................ | 707/205 |
| 6,434,541 B1 | | 8/2002 | Tawel et al. | |
| 6,460,059 B1 | | 10/2002 | Wisniewski | |
| 6,493,717 B1 | | 12/2002 | Junkin | |
| 6,615,258 B1 | | 9/2003 | Barry et al. | |
| 2001/0018687 A1 | | 8/2001 | Gonzalez et al. | |
| 2001/0020237 A1 | | 9/2001 | Yarnell et al. | |
| 2001/0049687 A1 | | 12/2001 | Russell | |
| 2002/0023141 A1 | | 2/2002 | Yen et al. | |
| 2002/0198985 A1 | | 12/2002 | Fraenkel et al. | |
| 2003/0167213 A1 | | 9/2003 | Jammes et al. | |

OTHER PUBLICATIONS

Glister, Paul, *Finding It On The Internet: The Internet Navigator's Guide to Search Tools & Techniques*, $2^{nd}$ edition (1996), 379 pages.
Bruce Hallberg et al., "Special Edition, Using Microsoft® Excell 97, Bestseller Edition," Que® Corporation (1997).
Elliotte Rusty Harold, "XML™ Bible," IDG Books Worldwide, Inc., An International Data Group Company (1999).
David Megginson, "Structuring XML Documents," Prentice Hall PTR, Upper Saddle River, NJ (1998).

* cited by examiner

Primary Examiner—Shahid Alam
Assistant Examiner—Hung Pham
(74) Attorney, Agent, or Firm—Finnegan, Henderson, Farabow, Garrett & Dunner, LLP

(57) ABSTRACT

Methods and systems consistent with the present invention provide a means for searching numerical data across networks such as the Internet, and removing the middle layer of query engines or servers used by conventional systems in retrieving data from relational databases over the Internet. The methods and systems in accordance with the present invention also provide a means for tying millions of computers together into a single database, thereby a query introduced to the system returns a table of data as a single database is capable of providing. Furthermore, the methods and systems consistent with the present invention provide the means for performing navigational, line item (or record-level), semantic, numerical, transformational, arithmetic, time-dependent, and cost based queries on numerical data. In addition, a user may also conduct select queries between unrelated databases.

48 Claims, 15 Drawing Sheets

| URL 1006 | ANCHOR 1008 | ELEMENT OR ATTRIBUTE 1010 | VALUE 1012 |
|---|---|---|---|
| WWW.NAME1.COM/TEST1.RDM | 42 | LI_ID | 2 |
| WWW.NAME1.COM/TEST1.RDM | 10 | LI_LEGEND | GROSS DOMESTIC PRODUCT |
| WWW.NAME1.COM/TEST1.RDM | 12 | LI_TITLE | GDP BY INDUSTRY |
| WWW.NAME1.COM/TEST1.RDM | 16 | LI_CAT | |
| WWW.NAME1.COM/TEST1.RDM | 18 | Y_AXIS_TITLE | $ IN BILLIONS |
| WWW.NAME1.COM/TEST1.RDM | 40 | LEVEL | 2 |
| WWW.NAME1.COM/TEST1.RDM | 41 | FORMAT | #,##0;(#,##0) |
| WWW.NAME1.COM/TEST1.RDM | 61 | RELATION | PARENT |
| WWW.NAME1.COM/TEST1.RDM | 80 | LI_NOTES | |
| WWW.NAME1.COM/TEST1.RDM | 25 | LI_DESC | |
| WWW.NAME1.COM/TEST1.RDM | 26 | LI_PREC | 0 |
| WWW.NAME1.COM/TEST1.RDM | 27 | LI_UNIT | $ |
| WWW.NAME1.COM/TEST1.RDM | 28 | LI_MAG | 9 |
| WWW.NAME1.COM/TEST1.RDM | 29 | LI_MOD | IN |
| WWW.NAME1.COM/TEST1.RDM | 30 | LI_MEASURE | |
| WWW.NAME1.COM/TEST1.RDM | 31 | LI_SCALE | |
| WWW.NAME1.COM/TEST1.RDM | 64 | LI_ADJUSTMENT | |
| WWW.NAME1.COM/TEST1.RDM | 20 | DATA_Y | 544.80, 585.20, 617.40 |
| WWW.NAME1.COM/TEST1.RDM | 20 | DSFORM | 459993294522209922345 |
| | | CLASS | TRUCK |
| WWW.NAME1.COM/TEST1.RDM | - | TIMESTAMP | 20010101.12300000 |
| WWW.NAME1.COM/TEST1.RDM | - | EXPIRATION | 20020101.12300000 |
| WWW.NAME1.COM/TEST1.RDM | - | DATA_SOURCE | GENERAL MOTORS, INC. |
| WWW.NAME1.COM/TEST1.RDM | - | HITS_TO_DATE | 148621 |
| WWW.NAME1.COM/TEST1.RDM | - | SERVER_RESPONSE | 13.2 |

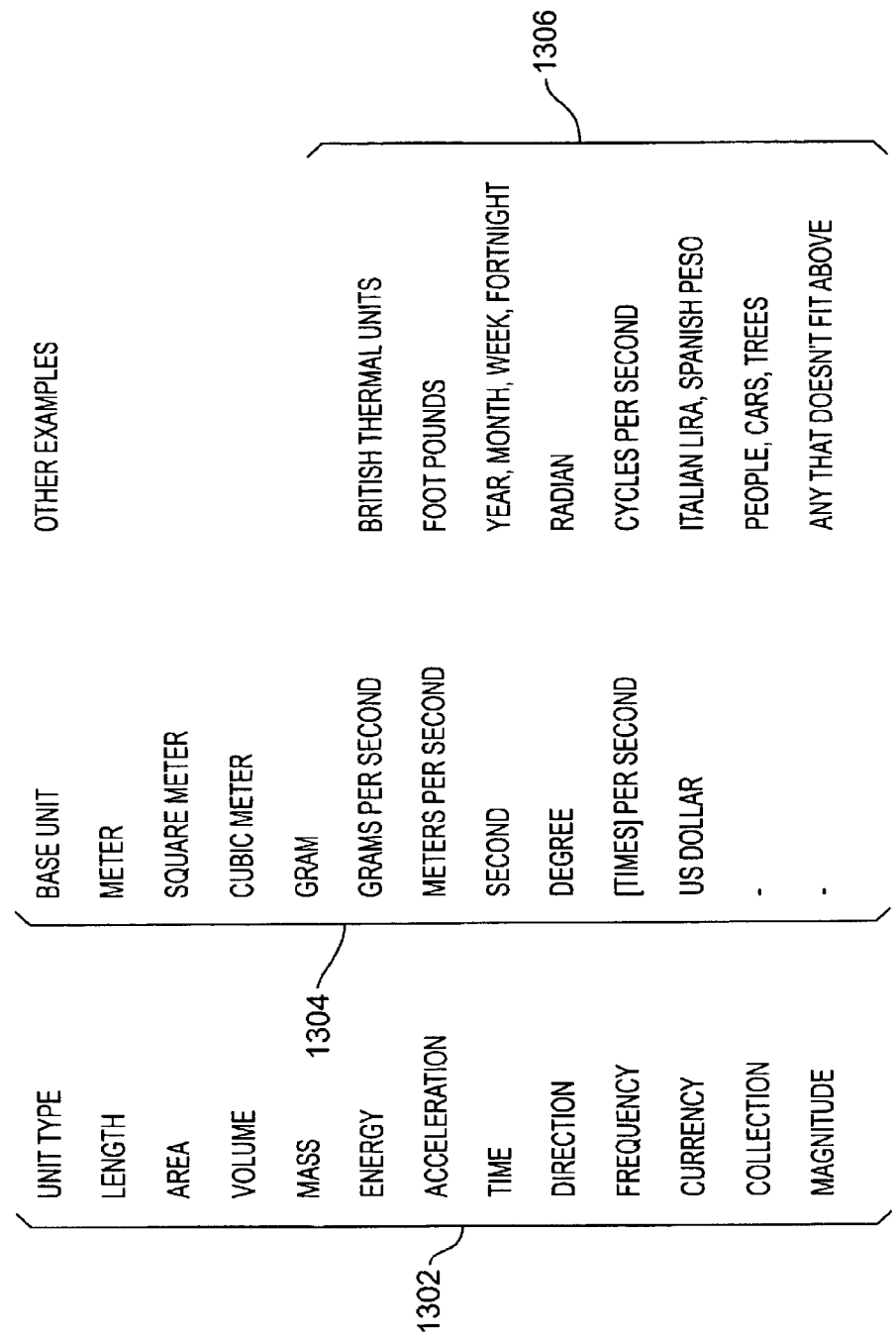

| UNIT TYPE | BASE UNIT | OTHER EXAMPLES |
|---|---|---|
| LENGTH | METER | |
| AREA | SQUARE METER | |
| VOLUME | CUBIC METER | |
| MASS | GRAM | |
| ENERGY | GRAMS PER SECOND | BRITISH THERMAL UNITS |
| ACCELERATION | METERS PER SECOND | FOOT POUNDS |
| TIME | SECOND | YEAR, MONTH, WEEK, FORTNIGHT |
| DIRECTION | DEGREE | RADIAN |
| FREQUENCY | [TIMES] PER SECOND | CYCLES PER SECOND |
| CURRENCY | US DOLLAR | ITALIAN LIRA, SPANISH PESO |
| COLLECTION | - | PEOPLE, CARS, TREES |
| MAGNITUDE | - | ANY THAT DOESN'T FIT ABOVE |

FIG. 13

RDL SEARCH ENGINE

RELATED APPLICATIONS

This application claims priority to U.S. Provisional Patent Application Ser. No. 60/183,152, filed on Feb. 17, 2000, which is herein incorporated by reference.

The following identified U.S. patent applications are also relied upon and are incorporated by reference in this application.

U.S. patent application Ser. No. 09/573,778 entitled "Reusable Data Markup Language," and filed on May 18, 2000.

U.S. patent application Ser. No. 09/573,780, entitled "Reusable Macro Markup Language," and filed on May 18, 2000.

U.S. patent application Ser. No. 09/573,419, entitled "Tree View for Reusable Data Markup Language," and filed on May 18, 2000.

U.S. patent application Ser. No. 09/573,413 entitled "Chart View for Reusable Data Markup Language," and filed on May 18, 2000.

FIELD OF THE INVENTION

The present invention relates to a search management system capable of accessing and retrieving tagged numerical data from data services (e.g., file systems), databases (e.g., relational or object-oriented), and servers on networks (e.g., LANs and WANs (e.g., the Internet)).

BACKGROUND

A known approach to searching and managing numerical data on the web is to hide the data behind vertical pipes of proprietary servers, expensive programmers, DBMS administrators, and non-standard formats. Users cannot search directly for numerical data. They must do a search for likely publishers of a certain type of data, then visit each site, go through a proprietary search routine, interpret the data to determine whether it fits the overall search criteria, then collect all of the individual results into a single result table—usually by manually retyping each site's results.

Furthermore, web search engines ("WSE") only perform "lookup" functions based on keywords. They cannot do select queries such as database management systems are capable of performing (where a precise definition of the desired result is given and the matching data is structured into a result dataset or table). The database management systems in turn, however, can only query datasets that are structured on the relational model and that have been specifically programmed to work together; they cannot perform queries directly over the web, and they are limited to special types of queries. Therefore, current web search engines ("WSEs") cannot search for numerical data, and database management systems ("DBMS's") cannot work across the web.

FIG. 15 illustrates a conventional approach to searches on the web which are characterized by two layers of query engines. The one closest to the end user 1500 (i.e., the web search engine 1502) provides indexing to particular sites or collections of tables. These servers 1504 are typically operated by companies such as Yahoo! and Lycos. The next layer back is a layer of query engines or servers 1504, which submit queries and retrieve data from either a relational database management system 1506, or an object-oriented database repository. For the most part, the query engines or servers are maintained by database administrators and developers for the individual web sites.

Four general sub-architectures of a conventional approach described above are used to conduct searches. They are summarized as follows. First, WSEs conduct searches using direct keyword indexing to HTML documents (e.g., Yahoo, Alta-Vista, Lycos, etc.). These search engines maintain very large indexes that map keywords to URLs. If a user types, for example, "57" as an input keyword, the user will receive instances where "57" is used in an HTML document ("NASDAQ falls 57", "#57—Doug Henry, Major League Baseball", etc.). As an example, for this particular query on AltaVista, a user will receive a list of over 11 million pages. The shortcomings of this approach are obvious: no context to the numbers, too many returns, no way to narrow the query to useful numerical data.

Second, WSEs conduct searches for database publishers (e.g., Yahoo, Alta-Vista, Lycos, etc.). If the user is searching for a number and it is not on an HTML page itself, it may be in a relational database that is accessible through an HTML form. The web search engine therefore can be queried for words or phrases that might be on that HTML page or related pages. In this approach, the burden is on the user to guess what words or phrases might be associated with such numbers, and who might publish such data.

Third, users may conduct searches of a repository of XML documents. For XML data, vendors such as XYZFind take the approach of essentially modeling the XML documents in a relational or object-oriented database structure, and building indexes to documents based on this internal "repository" structure. Among the shortcomings are the facts that only documents in that particular relational database can be accessed (not data distributed in documents across the web) and that data from different taxonomies are not directly comparable and, therefore, a search would not produce all possible results.

Finally, users may conduct searches of direct relational databases (e.g., proprietary database access objects based on SOAP, network objects, etc.). The approach for these databases is to directly connect a relational database management system to the user's client browser. The advantages are speed of access and ability for the programmers to control exactly what is accessed, by whom, and in what form. The disadvantages are that multiple, unrelated document sites cannot be searched, a common data model is assumed, and there is a high cost for middleware programmers and database administrators.

Based on the above conventional systems and the general sub-architectures of the conventional approaches, WSEs and relational database systems have serious drawbacks uniting a network of remote computers. They are incapable of efficiently tying millions of different data tables together into a single database, so that a query put to the system will return a table of data just as a single database system is capable of providing.

Also, conventional systems and general sub-architectures of conventional approaches are incapable of performing non-select queries. A "keyword select query" is a request for all items in a dataset that contain a particular word(s). For example, "Give me a list of all web pages with the word 'baseball' on them." Conventional WSEs are designed to do keyword select queries, but they cannot perform many different types of queries such as the following.

First, conventional WSEs do not perform navigational queries. A common occurrence for users is "I don't know what I'm looking for, but I want to know what's available".

A user undertaking a navigational query wants to see a lot of context, suggestions for related information, and leads to other items. A "select query", by contrast, returns only an answer that meets the strict requirements of the query put to the system.

Second, conventional WSEs do not perform database record-level queries. The current model for accessing data on the web is the "client-server-database" model. The client PC sends a request to the database server, which sends the request on to a relational database, which returns an answer. The problem with this approach is that current web search engines can only index HTML pages, not relational data tables—the database server acts as a wall preventing the search engine from seeing the data. Users must guess which sites might internally have the data they want, do a search for those sites, then go query those databases individually.

Third, conventional WSEs do not perform semantic queries. Current search engines operate by indexing keywords according to the URL's of pages that contain them. A search for "car" will bring up pages with "car" in them, but not "truck" or "bus" or other related items that the user may wish to know about such as variants in spelling, variants in usage, and variants in language. For example, a user searching for "dog" may want German pages with "Hund," the German translation for dog.

Fourth, conventional WSEs do not perform numerical queries. Numbers on HTML pages are merely text characters; they possess no value, units, measure, meaning, or structure. A search cannot, therefore, be performed for numbers which possess such qualifiers. A user cannot, for example, search for pages, which reference companies with "sales >$100 million" (value=>100, meaning=sales, units= US Dollar). Companies with "$101 million", or "$100,000,000" even "revenues>$100 million" cannot be found.

Fifth, conventional WSEs do not perform transformational queries. Transformational queries are those that require numbers to be transformed in some way to test whether they meet the requirements of a query statement. Suppose, a company's financial statements are presented in quarterly data, and a query is made for companies with "annual sales>$100 million". This request may be equivalently stated as companies with "annual sales>75 million (British Pounds)", or sales listed quarterly with sales greater than $25 million per quarter. Keyword searches (and general database select queries) cannot make these types of transformations in the course of their searches.

Sixth, conventional WSEs do not perform arithmetic queries, such as those that may require a mathematical calculation to be performed on the data searched during the searching process. For example, a user may not perform a search such as the automatic calculation of a batting average over time.

Arithmetic queries involve complex calculations, often requiring a specialized language (such as the Reusable Macro Language, U.S. patent application Ser. No. 09/573, 780). For example, a query might draw financial data from 10 web sites, calculate a set of financial rations, then conduct a search for companies that meet that profile. By their use of multiple sources, derived values, and complex operations, arithmetic queries are distinguished from numerical queries, which use basic comparison operators and transformational queries, which change the underlying units, measures and magnitudes.

Seventh, conventional WSEs are incapable of performing time-dependent queries. Queries that are time-dependent may take the form of "Let me know when . . . ." These types of queries may have a refresh capability, with related controls on scheduling, expiration of request and so forth. An example of this type of query would be if the user wants a notification (for example, by email) any time the search engine becomes aware of a bank company stock trading at less than 1.0 times book value.

Finally, conventional WSEs are incapable of performing select queries between unrelated databases. They are incapable of performing select queries when there is no common key. "Keys" are words or strings of text that are common to two datasets and allow joins to be performed on the two tables (linking columns from each to create a new dataset) in a relational database. A "join" is a method by which data from two different data tables can be combined into one table by matching records based on a common set of information (i.e., a social security number). This is not an efficient solution where the whole database is not under the control of one authority which can enforce consistent vocabulary, spelling and usage.

The current reliance of relational databases on matching exact spellings of key fields is a major hindrance to the development of a web-like linking of documents. Differences in wording, spelling and usage mean that documents created by different people, in different countries, potentially in different languages, will never have a common "key" that allows them to be linked.

Therefore, based on the deficiencies of conventional systems and the general sub-architectures of conventional approaches to searching data on networks such as the Internet and in relational databases, it is desirable to overcome the aforementioned problems and other related problems.

SUMMARY

Methods and systems in accordance with the present invention provide a system for querying and formatting tagged numerical and text data comprising: an index comprised of the tagged numerical and text data contained within a plurality of documents; and a server for maintaining and querying the index, and receiving a query. In response to the query, the server collects the tagged numerical and text data within the plurality of documents that satisfy the query, formats a resultant data set from the collected tagged numerical and text data, and transmits the resultant data set.

Also, methods and systems consistent with the present invention provide the capability to search numerical data across networks such as the Internet, and remove the middle layer of query engines or servers in retrieving data from relational databases over the Internet.

Further, methods and systems consistent with the present invention provide the means for performing navigational, line item (or record-level), semantic, numerical, transformational, arithmetic, time-dependent, and cost based queries on numerical data.

Further yet, methods and systems consistent with the present invention permit a user to monitor the progress of the search, refine the search, and manipulate the result into various views.

BRIEF DESCRIPTION OF THE DRAWINGS

FIG. 10 depicts the resulting records produced by a query and stored in a LineItemIndex table depicted in FIG. 9 in accordance with the present invention;

FIG. 13 depicts a table of unit types used in transformation based searches in accordance with the present invention;

DETAILED DESCRIPTION OF THE INVENTION

Overview

Methods and systems consistent with the present invention provide a means for searching numerical data across networks such as the Internet, and removing the middle layer of query engines or servers used by conventional systems in retrieving data from relational databases over the Internet. The methods and systems in accordance with the present invention also provide a means for tying millions of computers together into a single database, thereby a query introduced to the system returns a table of data as a single database is capable of providing.

Furthermore, the methods and systems consistent with the present invention provide the means for performing navigational, line item (or record-level), semantic, numerical, transformational, arithmetic, time-dependent, and cost based queries on numerical data. In addition, a user may also conduct select queries between unrelated databases. During the various queries, methods and systems consistent with the present invention allow a user to monitor the query results and refine the query request during searching.

Methods and systems in accordance with the present invention also provide means for a user to conduct queries for programming code by function and has the capabilities to distinguish between requests for data and requests for programming functionality.

System Hardware Components

Figure 1:
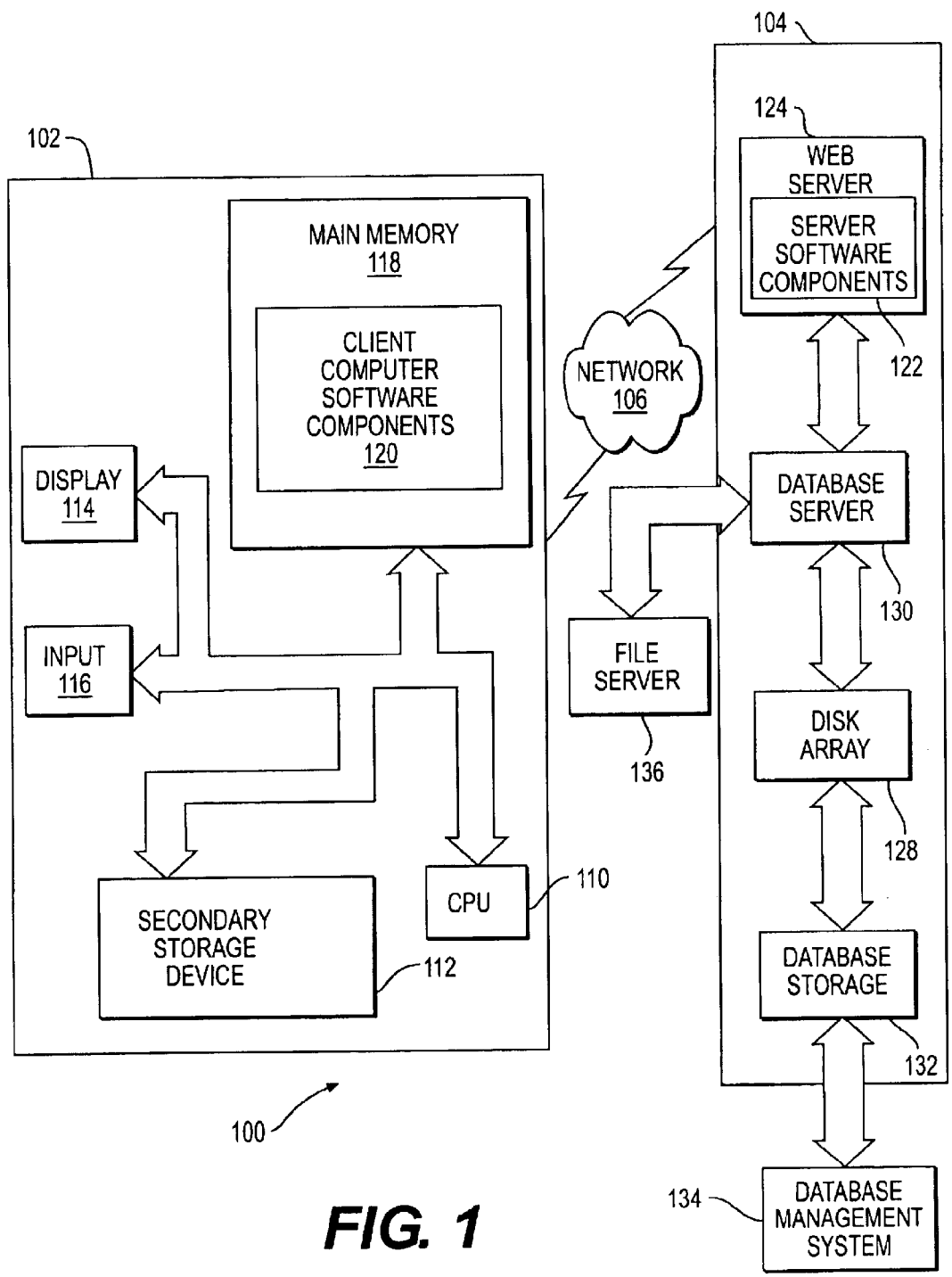
FIG. 1 depicts a data management system suitable for use in accordance with the methods and systems of the present invention.

FIG. 1 depicts a data management system 100 that is suitable for use with methods and systems consistent with the present invention. Data management system 100 comprises a client computer 102 and a server computer 104 interconnected via a network 106 (e.g., a Lan or Wan (e.g., the Internet)). The network 106 alternately can be replaced by an interprocess mechanism such that the software components of computers 102 and 104 are, in fact, run on the same computer. The server computer 104 provides Reusable Data Language ("RDL") documents to client computer 102. The transmitted RDL documents may be ASCII text documents which contain text and numerical data. RDL documents were referred to as Reusable data Markup Language ("RDML") documents in U.S. patent application Ser. No. 09/573,778 which provides a detailed explanation of RDML documents and was previously incorporated herein.

Client computer 102 includes a central processing unit (CPU) 110, a secondary storage device 112 (e.g., a hard disk), a display device 114, an input device 116 (e.g., a mouse and keyboard), and a main memory 118, containing client computer software components 120.

FIG. 1 also depicts a web server 124 on server computer 104 that sends RDL documents to client computer 102 via network 114. In one system consistent with the present invention, the web server 124 sends RDL documents over the network 106 and may be connected to a database server 130, which holds RDL documents. Database server 130 may receive RDL documents from the disk array 128, which may receive data from database storage 132.

In another embodiment of the consistent with the present invention, the RDL documents sent by web server 124 are retrieved from file server 136 through database server 130. Protocols used in the transmission of RDL documents between the server 124 and the client computer 102 include, but are not limited to, HyperText Transfer Protocol (HTTP) and File Transfer Protocol (FTP).

The RDL documents are served from web server 124, not from database management system 134. RDL documents can be created on the fly in disk array 128 and served from actively managed databases. However, if the data documents are created on the fly from an actively managed database system, the data management system 100 searches the RDL documents as quickly as the data in the RDL documents can be updated.

The web server 124 may be implemented as a "servelet": a software application that resides on an internet or intranet server; it can reside on client computer 102. Client computer 1102 maintains an index of information available on various RDL web pages. The web server 124 receives query statements from the client computer 102, collects the information available on the various target data files, formats a resultset file, and returns the resultset to the client computer 102. This web server 124 also is responsible for finding new RDL documents (by following hyperlinks or other pointers) and maintaining a list of RDL web pages, and other servers with which it can communicate. The above functions are referred to as "web indexing" or "web crawling."

Web server 124 may be designed as a group of cooperative and/or redundant servers that may themselves form a web of servers for a number of reasons. First, there is simply so much data in the world that it is unreasonable to expect that a single machine—even a massively parallel supercomputer—can handle all of the traffic and all of the information. To be truly scalable and to handle all possible data, a network of web servers helps meet the requirements for size, speed, and reliability.

In one implementation of the data management system 100, the components include but are not limited to an index (which may be a database table); the processors, which convert user queries to SQL queries and converts results into progress and result screens); and the transformation routines. These components may be on the client, or on the server; or spread across several servers, or in any permutation of clients and servers.

One skilled in the art will also appreciate that aspects of methods and systems consistent with the present invention may be stored on or read from other computer readable media besides memory like secondary devices, such as hard disks, floppy disks, and CD ROM, or a carrier wave from a network (such as the Internet). Additionally, one skilled in the art will also appreciate that the data management system 100 may contain additional or different components.

Client and Server Computer Components

Client Computer Software Components

Figure 2:
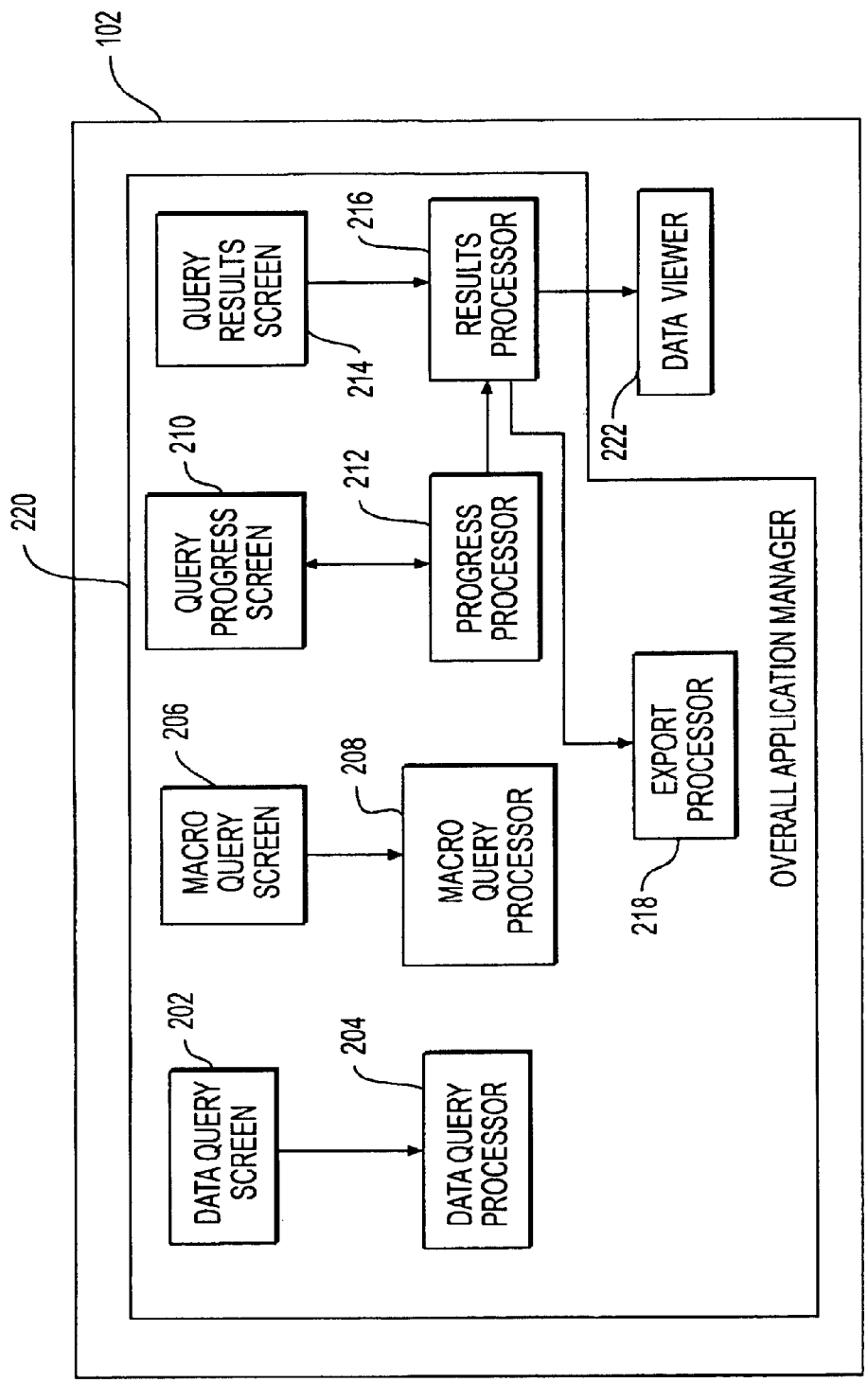
FIG. 2 depicts a block diagram of software components of the client computer depicted in FIG. 1 in accordance with the present invention.
Figure 8:
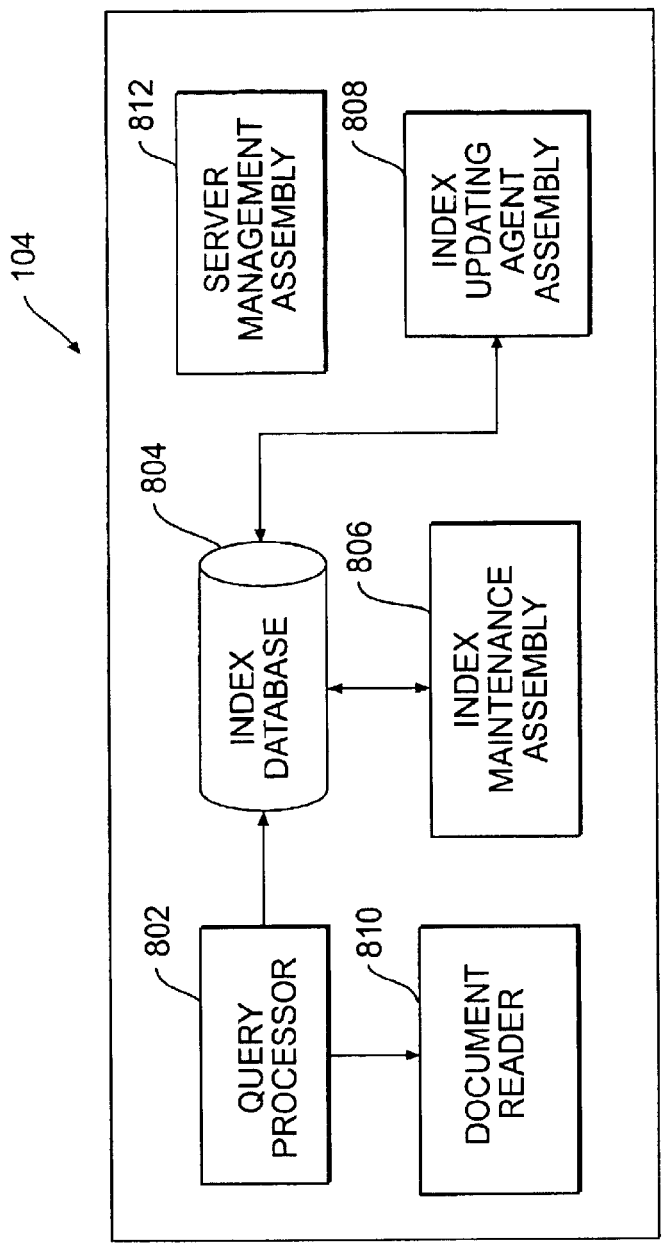
FIG. 8 depicts a block diagram of software components of a server computer depicted in FIG. 1 in accordance with the present invention.

FIGS. 2 and 8 illustrate software components (120 and 122) of client computer 102 and server computer 104 in accordance with the present invention. These components illustrated in FIGS. 2 and 8 do not necessarily reside on separate computers for functioning as "client" and "server." These aggregations may be for logical construction. In actual practice, it may be preferable to either create two separate applications or to put both applications on a web server host, with the query and result pages sent to a user's web browser.

As illustrated in FIG. 2, client computer software components may include data query screen 202, data query processor 204, data query screen 206, macro query processor 208, search progress screen 210, progress processor 212, search results screen 214, results processor 216, export processor 218, overall application manager 220 and RDL data viewer 222.

Figure 3:
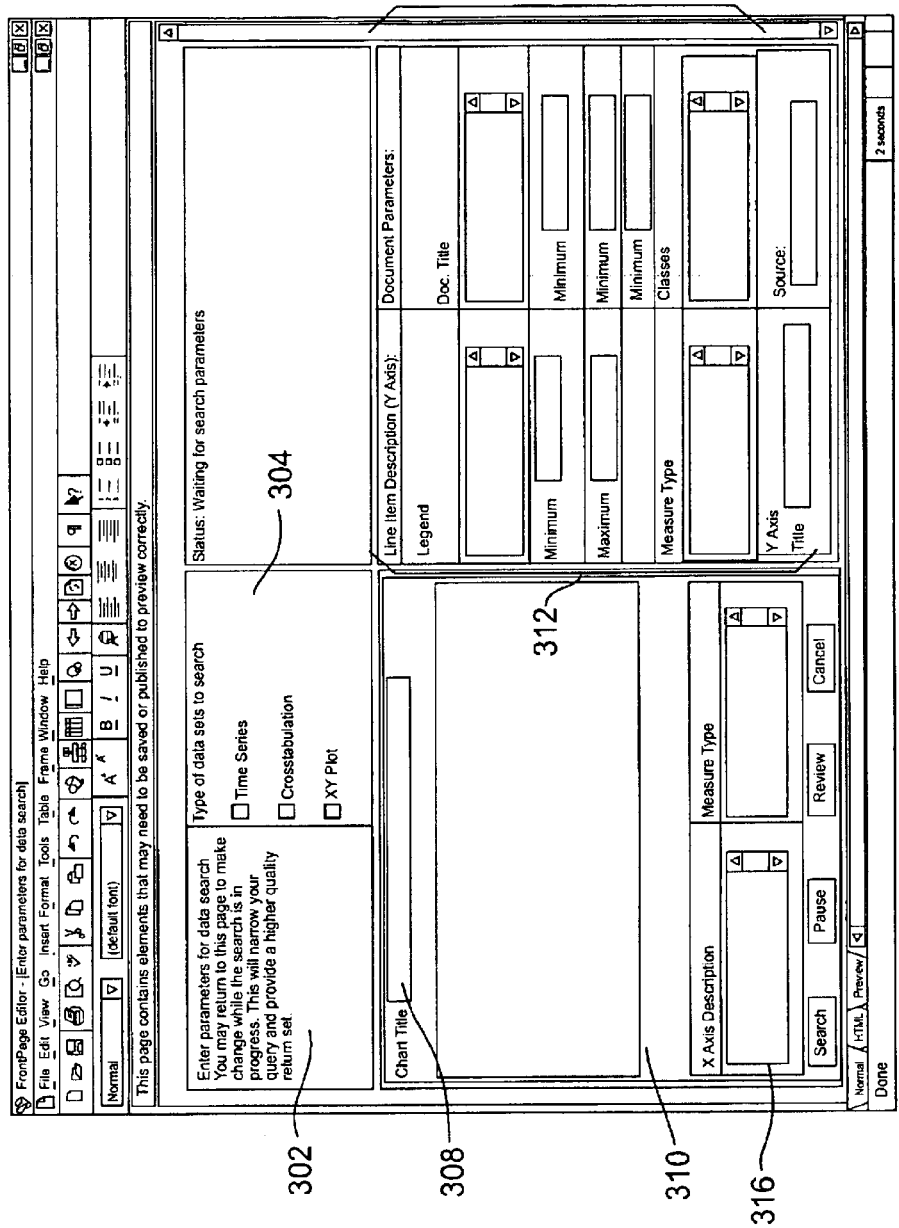
FIG. 3 depicts a screen shot of a data query screen depicted within software components of the client computer in FIG. 2 in accordance with the present invention.

FIG. 3 illustrates an exemplary data query screen 202 of client computer 102. The data query screen 202 allows a user to enter the query parameters and narrow the query while it is in progress. The user types information into the various input boxes in data query screen 202 to describe the data that the user desires the query to retrieve. The contents of the input boxes are used to build a select query on a database of tag elements in RDL documents.

The exemplary data query screen 202 includes message panel 302, data type panel 304, status panel 306, chart title 308, chart area 310, Y-axis line item elements entry block 312, document elements entry block 314, X-axis line item elements entry block 316, and action buttons 318.

The function of the various components of an exemplary data query screen 202 are as follows.

Message panel 302 instructs the user to enter the search parameters and instructs the user on how to refine the search while it is in progress. The data type panel 304 instructs the user that there may be three types of data series found in an RDL document. In one implementation, the data series types are: time series, crosstabulation, and XY plot. The time series data type displays the x values on a chart as time periods (such as "1959" or "Week ending Mar. 21, 1987"). The crosstabulation (or category) data type displays the x values as categories that are string identifiers, such as "Alabama" or "West Virginia," and the XY plot data type displays the X and E Y axes both as independent variables (e.g., both axes have floating point values for their labels, such as X=43.7, Y=12.5). The purpose for specifying the data type is for the RDL data viewer 222 to determine the type of data it is processing, and to match the correct X and Y values. In short, the RDL data viewer 222 needs to determine the number of independent axes to set up. Data viewer 222 may be an RDL data viewer 222 as described in co-pending U.S. patent application Ser. No. 09/573,778. The data series types are also described in that application.

Status panel 306 presents ongoing messages regarding the status of the query, until progress screen 210 is provided to the user. The search process screen 210 will be discussed in detail below.

Chart title 308 allows a user to enter one or more keywords with boolean operators, if desired, that would be found in the title of a data series chart. For example, if the user wants to find all data series which, when charted, would possess a title containing the words "U.S. Employment" and "Total GDP", a search could be executed on the search string "[US Employment]+[GDP]".

Chart Area 310 allows a user to sketch, with a mouse for example, the desired shape of a chart of a data series. In one implementation, this shape may be converted to a numerical sequence which is stored in a "dsform" element in index database 1000 (discussed below). The "dsform" element contains a numerical representation of the shape of the data series. For example, the numerical sequence may be a series of 20 codes (e.g., 20 digits), each representing one $20^{th}$ of the underlying data series. If the data series is convex within that period (i.e., reaches a local maximum which has an absolute value higher than the local minimum), the digit assigned for that period is 6 through 9, depending on the height of the maximum. If the curve in that section is concave (i.e., reaching a local minimum that has an absolute value greater than the local maximum, it is assigned a digit 1 through 4 depending on the depth of the minimum). If there is no change (within 5% of the mean for the section), the digit assigned is 5. When all the numerical values are accumulated (e.g., 45999329452209922345 represents 20 segments that start with a local minimum and end with a flat line), the result describes a particular shape of a curve.

Line item elements 312 may be input items provided by the user, and may be combined with a logical AND operator. For example, to view all data series regarding Gross Domestic Product (GDP) that are greater than 3 trillion dollars, the user types "GDP" in the box marked "Legend", 3 in the box marked "Minimum," "trillion" in the box marked "Measure type," and "$ US" in the box marked "y axis title". Line item elements 312 and their attributes are discussed in greater detail in co-pending U.S. patent application Ser. No. 09/5731778.

Document elements 314 are similar to line items elements 312, but apply to metadata regarding the document itself For example, to find a document that shows depreciation in the financial statement of an airline industry company, type "<SEC:Depreciation>" in and "<SIC:Air>" in the classes box. If a box is left blank, it is simply ignored as a criteria; all documents are returned subject to the imposed criteria. The "timestamp" box sets bounds on when the document was created, e.g., "<December 2001" would indicate the document was created before December 2001. The "Source" and "Formatting Source" box each receive string arguments and modifiers.

X axis elements 316 are similar to the line item elements 312 and document elements 314, but relating to the X axis values. "X Axis Description" is analogous to "Legend" on the Y axis, and "Measure Type" is the same for both the X and Y axis. The X axis represents the independent variable in a data set. X axis elements 316 are also discussed in greater detail in co-pending U.S. patent application Ser. No. 09/5731778.

Action buttons 318 initiate the function identified on the button. For example, the "search" button initiates a search.

Returning to FIG. 2, data query processor 204 reads each of the components of the data query screen 202 and produces a query string. For example, the SQL query string may be of the following form:

SELECT url FROM tb1_data WHERE (att1="Type" AND val="Time Series") AND ("att1="Xaxis" AND att2="Year" OR "Quarter" OR "MONTH") AND (att1="li_legend" AND "GDP" OR "Gross Domestic Product")

The macro query screen 206 allows the user to specify the types of behavior that is desired of a "macro." Just as data can be searched on the web, RXL macros can also be searched on the web or locally. RXL is an XML-based format that describes programming operations to be carried out on an RDL document. By searching for specific capabilities, users can find and download macro documents that provide specific functions for specific data documents.

Because RXL documents may be ASCII documents that follow the eXtensible Markup Language (XML) specification and the Document Object Model (DOM), they lend themselves to being searched and manipulated by automated means. There are several types of elements in an RXL document that are indexed (an index may be a database table that maps an element name and element value to a URL).

Figure 4:
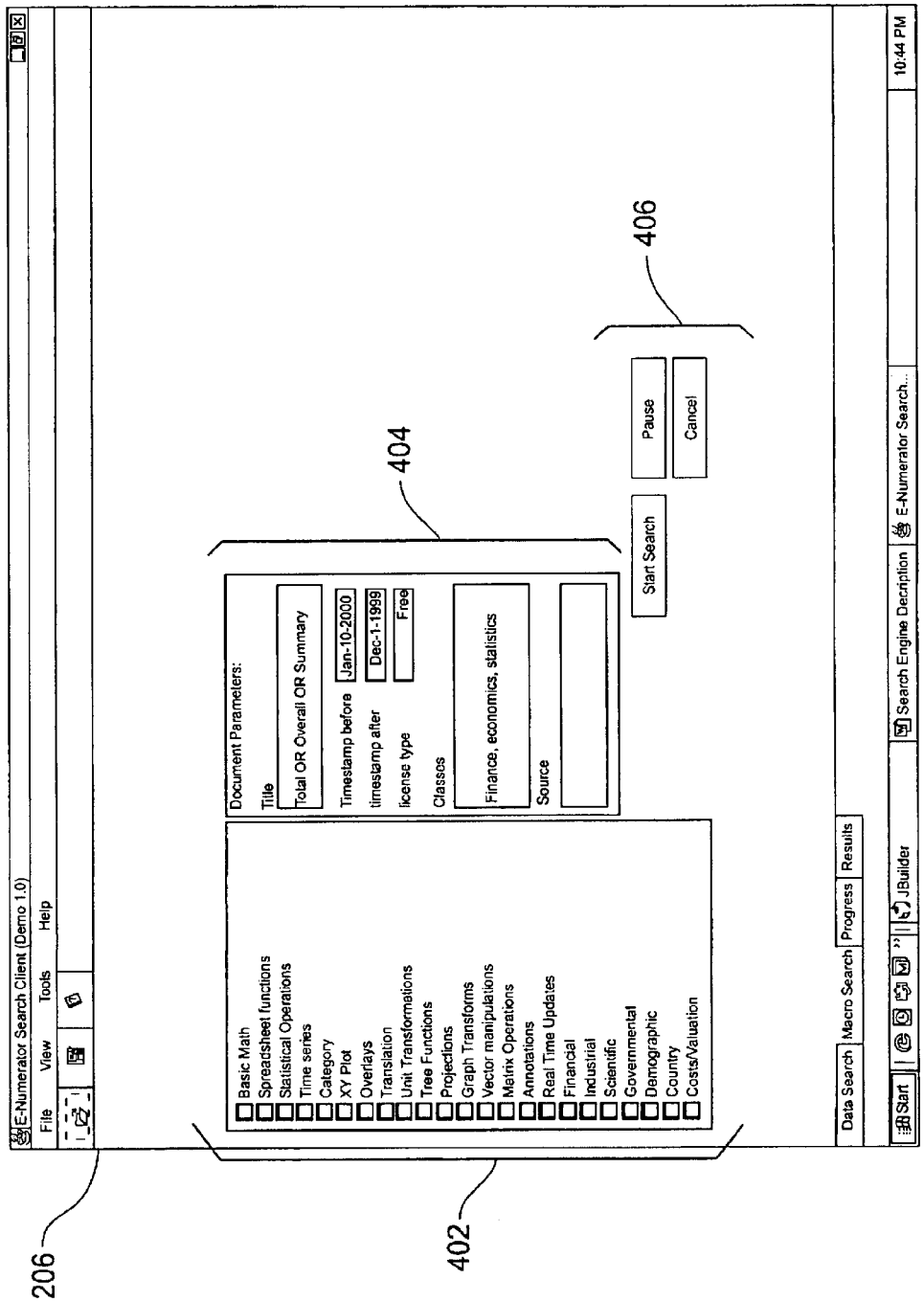
FIG. 4 depicts a screen shot of a macro query screen depicted within software components of a client computer in FIG. 2 in accordance with the present invention.

FIG. 4 illustrates a macro query screen 206 consistent with the present invention. One element of a macro is the "macro_class," which is a general description of the type of work that the macro performs. For example, a macro that performs a linear regression on a data series may be classified under the "statistical operations." In one implementation, there are about 20 of these categories, and they are shown in block 402 of FIG. 4. In FIG. 4, the user simply checks off the type of work the macros are expected to perform, and those macro documents are returned by the server or locally.

Block 404 shows some criteria boxes: document title, timestamp, etc. Again, the user enters information into these input form items, and they are used to create a SQL query on a database. The action buttons 406 perform as one would expect: "Start search" initiates a query on the RXL index, "Pause" stops the search so that the user can change the selection criteria, and "Cancel" halts the operation entirely and clears the input criteria. For more details on RXL macros refer to U.S. patent application Ser. No. 09/573,780. (In that application, they are referred to as RMML macros.)

The macro query processor 208, like the data query processor 204, reads all of the graphical input items in macro query screen 206 and creates a SQL query string which may be passed to the server computer's query processor 802. An exemplary SQL query string is of the form:

"Select from Index Where Timestamp=2000.1201000'."

Furthermore, macro query processor 208 performs conversions from common-language formats to machine-readable formats (e.g., from "Dec. 1, 2000" to "2000.1201000"), if they are required.

Figure 5:
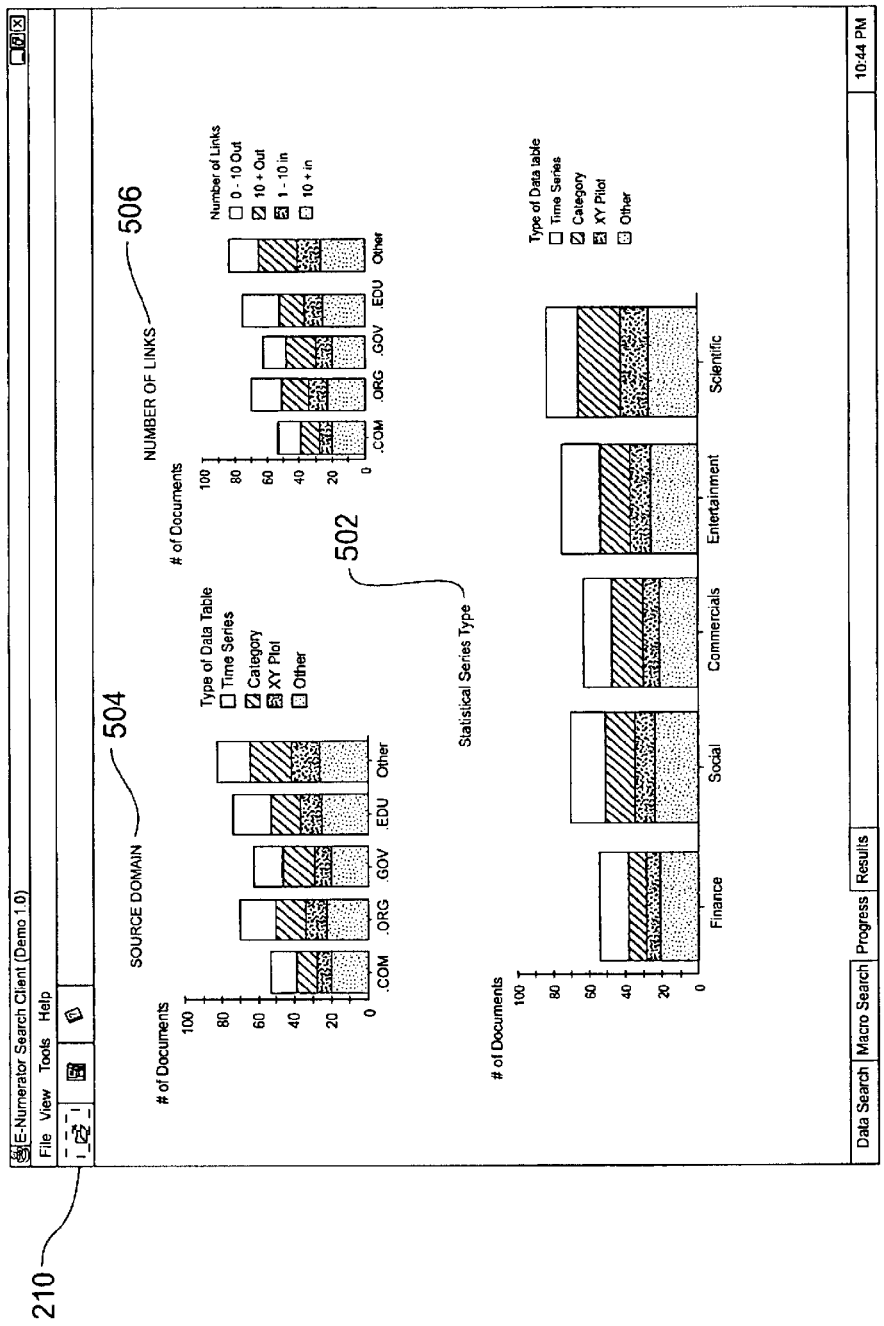
FIG. 5 depicts a screen shot of a query progress screen depicted within software components of a client computer in FIG. 2 in accordance with the present invention.

FIG. 5 shows a search progress screen 210 that provides the user with a map of the overall results in accordance with the present invention. As illustrated in FIG. 5, the results are broken down by various metrics, such as the return results by statistical series type, the sources of the results 504 (e.g., .com, .edu, and, .gov), and the number of links 506 appearing in a document. Notice that this typically depicts more than just a list of documents. The user may view the progress of the search as the charts change to reflect the search progress. As the query is progressing, the user can select certain narrowing criteria by indicating such criteria on the search progress screen 210. The narrowing instructions are relayed to the server computer 104, which continues its search with the new criteria.

During the search progress stage, the user may not only delete columns from the chart (and thus the search), but also "combine columns" by dragging one on to the top of another. This leaves both criteria in the search, but merges them for display purposes, allowing the user to see the relative returns of different (customizable) categories.

The search progress processor 212 receives progress update information from web server 124, receives the narrowing criteria from the user through search process screen 210, and passes narrowing criteria to web server 124.

Figure 6:
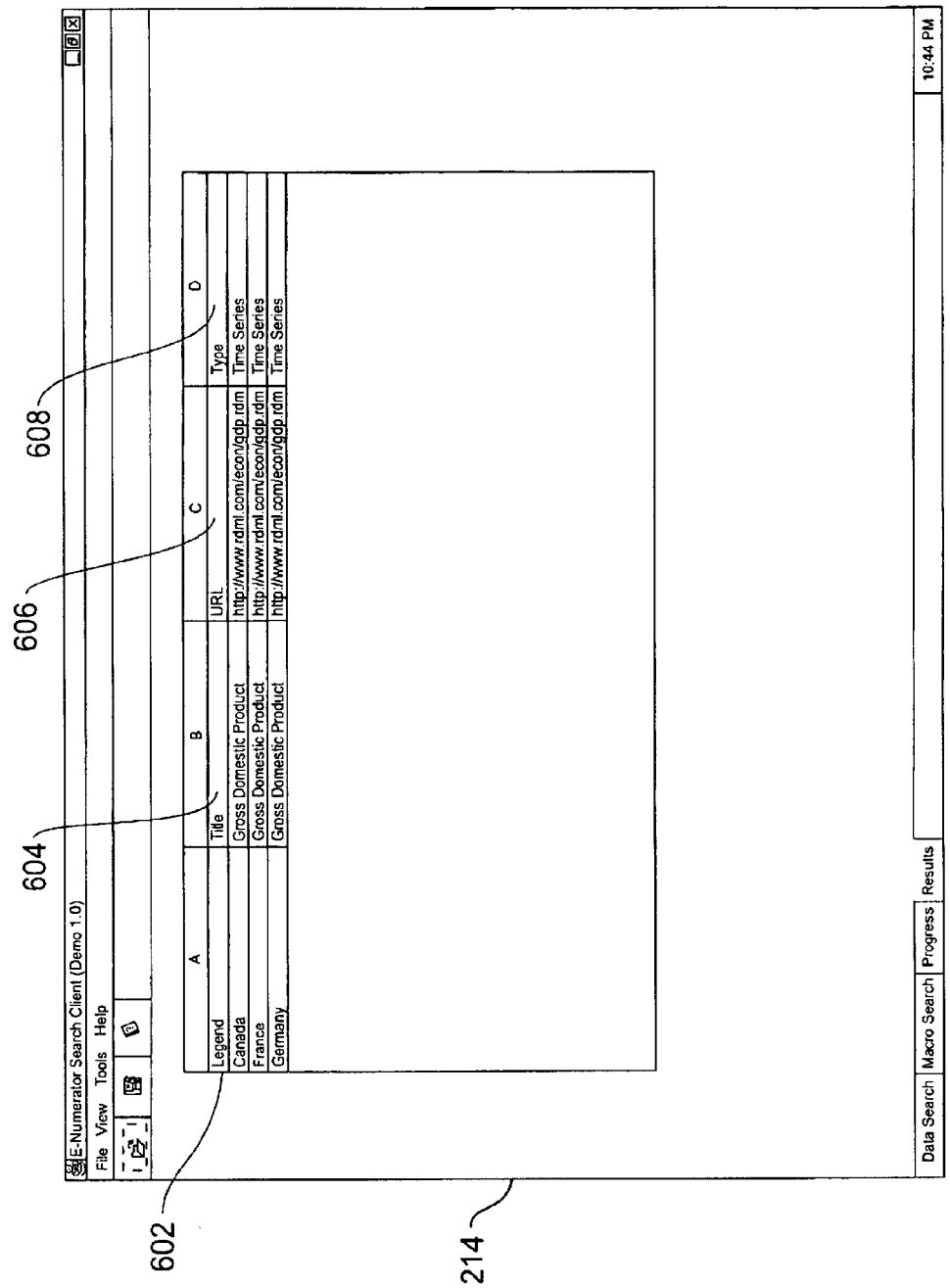
FIG. 6 depicts a screen shot of a query result screen depicted within software components of a client computer in FIG. 2 in accordance with the present invention.

Once a query is complete, search results screen 214 provides the user with the query results, which the results screen received from the results processor 216, which it received from web server 124. In one implementation, the results are provided as one of two kinds of information, either a list of RDL documents that meet the criteria or have line items that meet the criteria, or a table of line items culled from one or more RDL documents and have been collected into a new RDL document. FIG. 6 is an example of a search result screen 214 displaying a list of RDL documents that met the query criteria. For each document, FIG. 6 displays a legend 602, title 604, URL 606, and data type 608.

Figure 7:
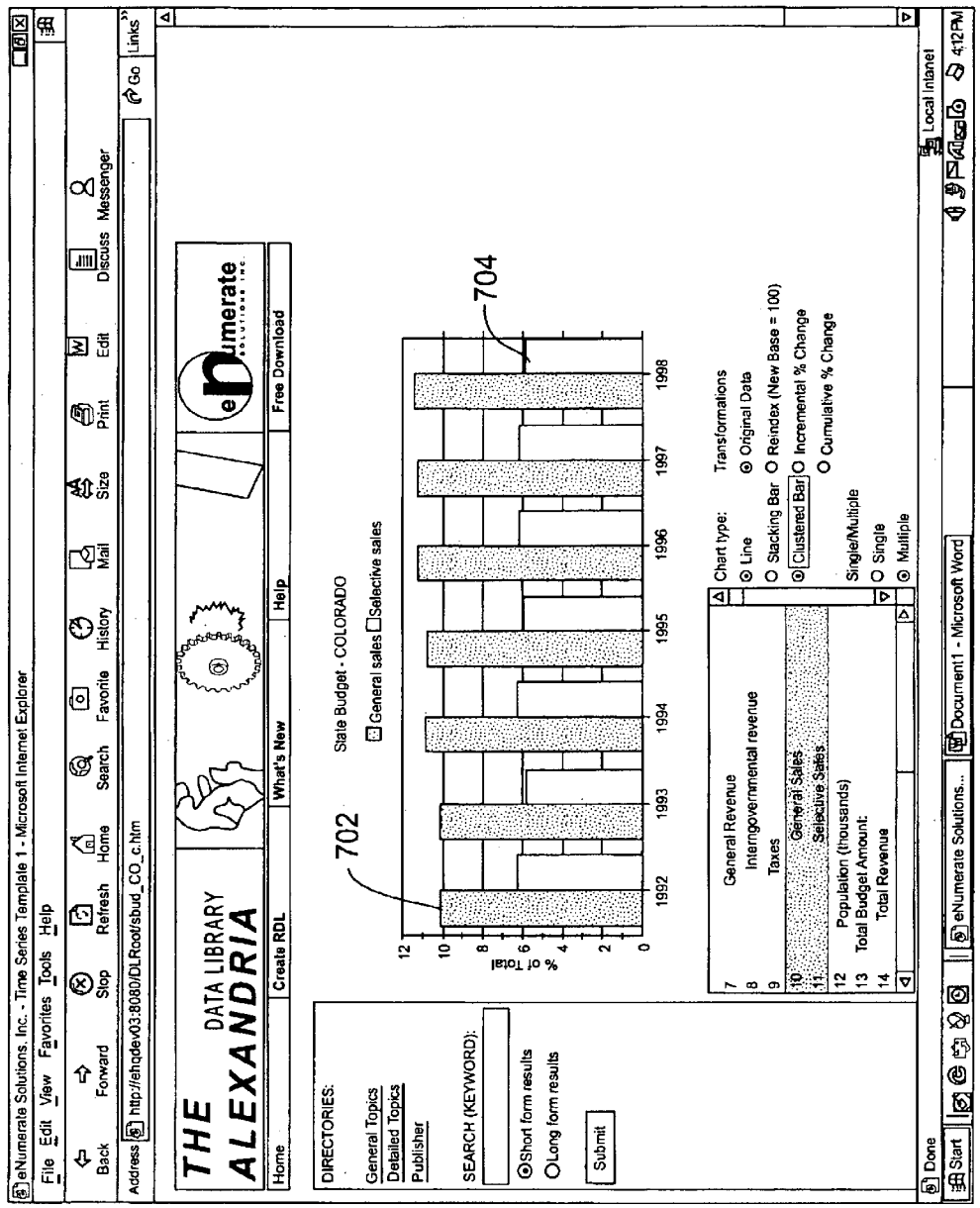
FIG. 7 depicts a screen shot of a chart of two data series plotted on the same chart in accordance with the present invention.

As the RDL documents are culled, line items that meet the criteria are identified and are collected into a resultset as shown in FIGS. 6 and 7. A resultset may be the equivalent of a flat file table in a database: a set of rows and columns. Each row represents a line item. The analogy is a loose one: most dramatically, in one implementation, each line item has not just one set of data, but two sets of data. Each line item has a set of "x values" that can be plotted on the x axis of a chart, and a set of y values that can be plotted on the y axis.

With the resultset created, the user can view each line item one by one as XY plots with a browser 222 in client computer 102 (as described in U.S. application Ser. No. 09/573,778). The user can view each line item by clicking on the lines in FIGS. 6 and 7. In fact, multiple lines can be plotted on the same chart if they are of the same data set type. For example, FIG. 7 shows that two time series data items may be placed on the same chart. In FIG. 7, the "General sales taxes" 702 and the "Selective sales taxes" 704 are plotted on the same chart.

The query results are also useful in other applications, and therefore, an export processor 216 exports the different result types. A document list provided as a resultset may be exported into a HTML or Rich Text Format (RTF) formatted text document. The resultset can also be exported to a new RDL document, or saved as an Excel or comma delimited text file. The export processor 216 simply takes the data from the respective models for the result views, applies the necessary reformatting, and provides the capability to save the results to either a file or the clipboard.

The methods and systems in accordance with the present invention also provide an overall application manager which is responsible for building the screens, tying the various software components together, providing menus, toolbars and status bars, and maintaining the help system. Typically, this is the user's normal web browser. It also provides the communications links with the server computer 104 over "http:" protocols.

Server Computer Software Components

In one implementation, the server computer 104 in accordance with principals of the present invention is comprised of a query processor 802, an index database 804, an index maintenance assembly 806, an index updating agent assembly 808, a document reader 810 and a server management assembly 812.

The query processor 802 is responsible for receiving query instructions from the client computer 102 and querying the index database 804 which will be describe in greater detail below. The query processor 802 distinguishes between data and macro queries, receives narrowing criteria from search progress screen 210, and provides efficiency-enhancing suggestions to the query process in the index database 804. As noted below, the index database 804 may not contain all of the line items in a document or all of the information available. The query processor 802 is responsible for noting the deficiencies in this area and passing a request onto the document reader 810 (described below) to fulfill the request for missing data.

Figure 9:
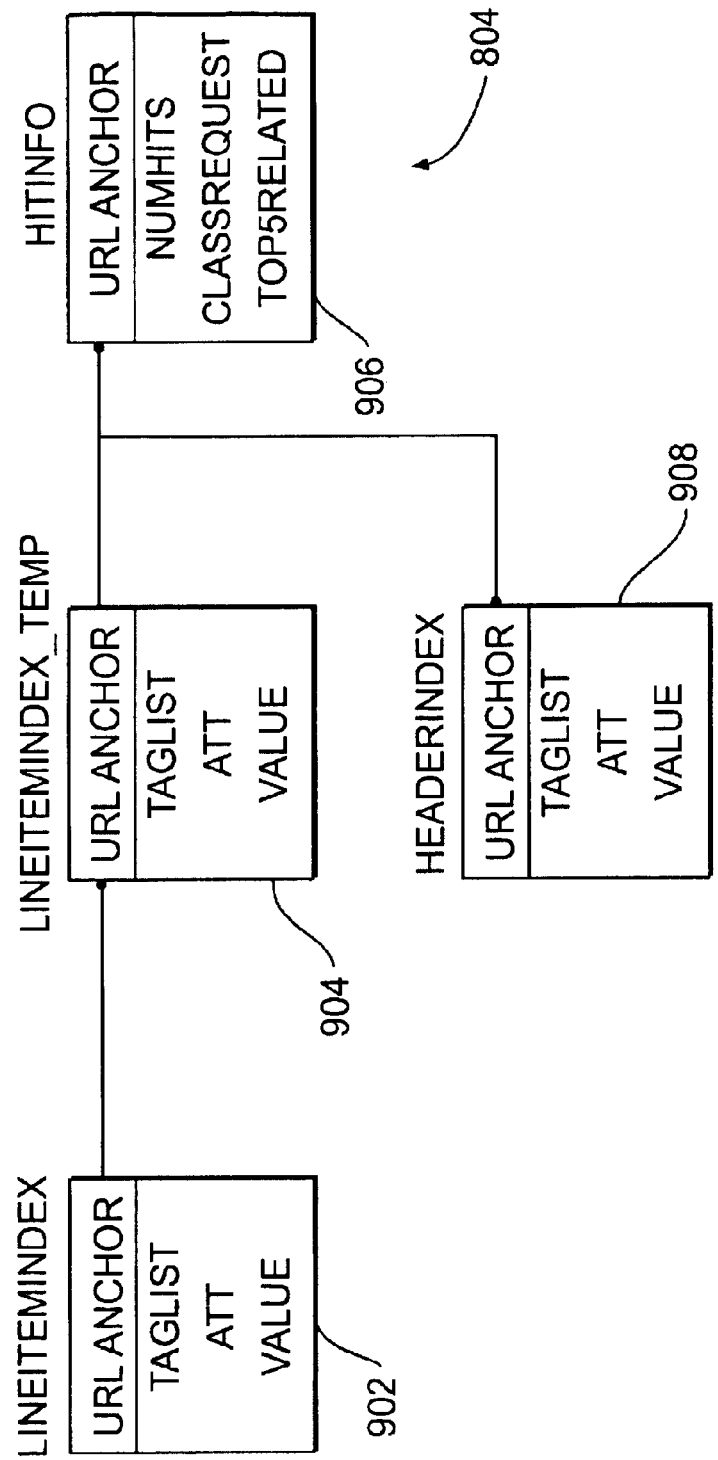
FIG. 9 depicts a block diagram of index data created by a web server depicted in FIG. 1 in accordance with the present invention.

The index database 804 may be relational database with the table structure illustrated in FIG. 9. The index database 804 may be comprised of LineItemIndex table 902, LineItemIndex_Temp table 904, HitInfo table 906, and HeaderIndex table 908. LineItemIndex table 902 is a long table containing a cross-reference of URL's and attribute values associated with the line items in RDL documents. Each line item corresponds to a record in a traditional database, with the addition of some documentation. This table is not intended to provide a full listing per document; duplicates and unimportant words (e.g., "the", "a", etc.) are eliminated.

The exemplary line item, from an RDL document, illustrated below and FIG. 10 provide an exemplary comparison of the data found in a line item of an RDL document, and the resulting listings in the LineItemIndex table 902, respectively. In comparing exemplary line item and FIG. 10, it can be seen that for each item listed in the exemplary line item there is an associated listing in the LineItemIndex table 902 of FIG. 10. For example, the first element of the line item illustrated below is "li_ID='2'." The associated entry is the first entry 1004 illustrated in FIG. 10. The first entry 1004 in LineItemIndex table 902 is comprised of URL 1006, Anchor 1008, Attribute 1010, and Value 1012.

Example of Line Item from RDL Document

```
<line_item
    li_ID = "2"
    li_legend = "Gross domestic product"
    li_title = "GDP by industry"
    li_cat = ""
    y_axis_title = "$ in Billions"
    level = "2"
    format = "#,##0;(#,##0)"
    relation = "Parent"
    li_notes = ""
    li_desc = ""
    li_prec = "0"
    li_unit = "$"
    li_mag = "9"
    li_mod = "in"
    li_measure = ""
    li_scale = ""
    li_adjustment = "">
<data_y>
544.80, 585.20, 617.40, 663.00, 719.10, 787.80, 833.60, 910.60, 982.20,
1,035.60, 1,125.40, 1,237.30, 1,382.60, 1,496.90, 1,630.60, 1,819.00,
2,026.90, 2,291.40, 2,557.50, 2,784.20, 3,115.90, 3,242.10, 3,514.50,
3,902.40, 4,180.70, 4,422.20, 4,692.30, 5049.6, 5438.7, 5,743.80,
5,916.70, 6,244.40, 6,550.20, 6,931.40,,,
</data_y>
```

In LineItemIndex table 902, URL 1006 identifies the source of the RDL document; Attribute 1010 provides the element attribute name; and Value 1012 provides the value for the element.

The URL may include several pieces of information. The first part of the URL (http/ftp/etc.) describes the protocol to be used by a browser in accessing the web server, the next part (e.g., /www.somedata.com/) describes the web server, the third part (e.g., /somedatapage.rdl/) points to the actual document, and the final part (e.g., /statab/) provides what is known as an "anchor" 1008 or an "xlink", which is a pointer directly to a specific line item. For example, if the data sought is in line item #42, then the "anchor" field will contain a "42". The anchor field is optional, however, because the whole document may be returned and the desired line item found at that time.

LineItemIndex_Temp table 904 follows the same structure as the LineItemIndex table, but is generally created once a query begins and contains successful matches to the query. Line items that are included in the resultset are checked for hyperlinks in real time to see if they point to any useful RDL documents and line items. If so, those line items are added to LineItemIndex_Temp table 904 and included in the search.

HitInfo table 906 contains data related to the popularity and content information of the various documents. It is linked to the other tables by the document URL. The "NumHits" field contains a running count of the number of times this document has been accessed in a successful search. The "ClassRequest" field is a comma-delimited list of the top 5 classes that were requested in connection with a successful search for this document. The "Top5Related" field contains a comma-delimited list of the top 5 related web sites to the one sought. To each of the top 5 classes and top five documents is pre-pended the number of access hits. This allows the rankings to be updated under real-time conditions.

Returning to FIG. 8, index maintenance assembly 806 is responsible for: locating new RDL-formatted documents (either by following hyperlinks of known documents or by accepting manual input from an operator); checking for changes in documents by looking at the "timestamp" and "expiration" attributes of the known documents; identifying duplicates; and other housekeeping tasks.

Index updating agent assembly 808 updates documents that have changed so all documents do not have to be updated unnecessarily. Index updating agent assembly 808 is comprised of a collection of routines that can parse and read XML, RDL, and RXL documents to look for specific items of information required to add a document or line item to the index database 804. There are numerous freeware and shareware software components that read, write, and process XML. One of the easiest to use in a research operation is entitled "Aelfred," which may be obtained online.

Document reader 810 is used by both the query processor 802 and the index maintenance assembly 806 to read and parse attributes and tag values from remote or local RDL documents, which may be in a text file format such as ASCII.

In one implementation, server management assembly 812 is responsible for building the go screens, tying the various software components together, providing menus, toolbars and status bars, and maintaining the help system. It also provides the communications links with the server computer 104 over "http:" protocols.

Server Computer Processes

Indexing Process

The server computer 104 in accordance with the present invention maintains the indexing and searching processes.

The indexing process 1100 involves searching the target universe of RDL documents, and building an index of key words and URLs which are used as links to the RDL documents.

Figure 11:
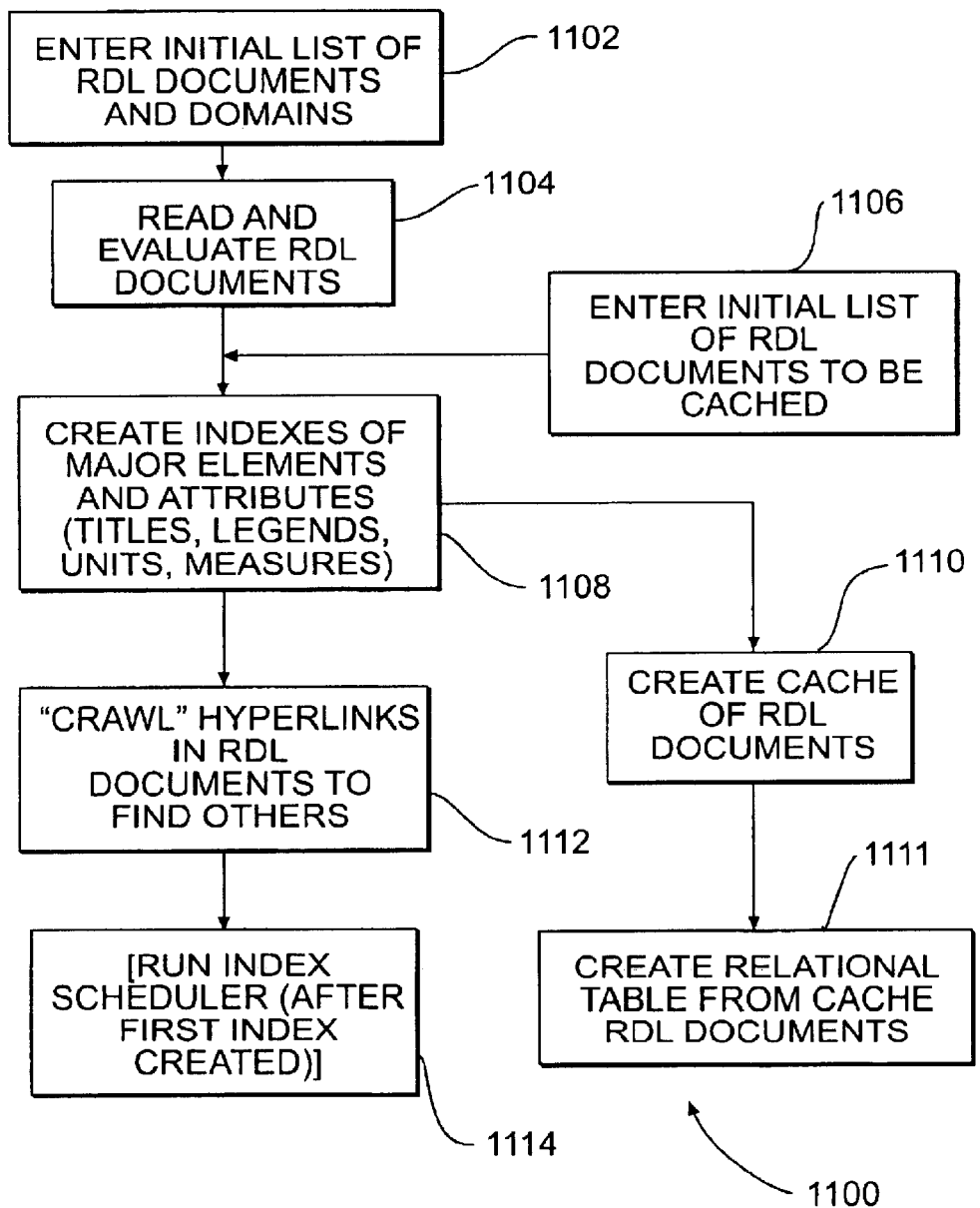
FIG. 11 depicts a flowchart of an indexing process conducted by a web server depicted in FIG. 1 in accordance with the present invention.

FIG. 11 describes the flow for creating an index of information of RDL documents over the Internet. This process is also amendable for the indexing of limited collections of RDL documents, such as those confined to a corporation's internal network.

In one implementation, the goal of the indexing process is to create a set of data tables which comprise the following four fields: URL, Anchor, Attribute, and Value, as illustrated in FIG. 10.

In one implementation, the indexing process starts with a user determined list of RDL documents and a list of domains, such as websites, file directories, or databases, that limit the search (step 1102). The constraint on the number of domains is implemented because the search process may be used in the context of a single corporation or working group. A standard XML Parser/Processor may be used to read the RDL documents, and as elements and attributes are encountered, they are evaluated for inclusion in the index (step 1104).

In evaluating the elements and attributes, in one implementation, the following rules are applied: (1) duplicates are ignored (the process need only identify that the keyword exists in an element in the document); (2) strings are parsed (e.g., "Net Equipment Depreciation" would be divided into three entries, one for each word); and (3) numbers are ignored. The indexing process applies the last rule because there are an infinite number of numbers and their indexing would be voluminous. Instead, numbers are tested in real time during the search process. This is explained in greater detail in step 1204 in the search process of FIG. 12. Although in other implementations, other rules may be applied. Besides elements excluded by these rules, in general, all elements of the entered list of documents are included.

Next, an initial list of cached RDL documents may be entered (step 1106). These are a set of RDL documents that are known at the outset to be more likely to be requested than others. These documents may be "cached"; that is, the documents will be copied to a local source and the restriction on cataloging numbers is relaxed.

At this step, the index of documents is created. A standard XML processor is used to proceed through each document, element by element, and then attribute by attribute to create an index of the major elements and attributes (step 1108).

In XML, "element" text values are the values appearing between opening and closing tags (e.g., "<data-source>US Census Bureau <data-source>" would have an element text value of "US Census Bureau").

"Attributes," by contrast, are found within an element tag itself. For example, "<line-item>li_legend=Total 'Revenues'><line-item>" would have an attribute named "li_legend" which has a value of "Total Revenues."

The XML processor collects both elements and attributes into name/value pairs and calls a software routine (or method) as each is completed. The "handler" method takes the URL, element/attribute name, and value and creates a new record in the index data table with those three values. The "cache" RDL documents are also handed off to an additional handler which collects all the attributes and elements into a relational table (step 1111). During the search process, the data query processor 204 will use this relational cache to create the RDL elements in real time, rather than searching the Internet to find the RDL document, to parse and process the elements.

In addition to the indexing of cached RDL documents, the server computer 104 also crawls hyperlinks in RDL documents (step 1112). There may be RDL documents that are not in the original list of RDL documents to be indexed. To try to find additional RDL documents, the indexing application records all RDL URL's it finds in the various "href" attributes of the documents it evaluates during the indexing process.

After the documents are indexed and the index is created, an optional step is executed to eliminate outdated information. In one implementation, in this step, index update agent 808 executes and visits every unique URL listed and performs the following: (1) checks whether the RDL document still exists, and if not, index update agent 808 removes all references to the document in the index; (2) checks whether each of the Attribute/Value pairs still exist, and if not, they are removed from the index; (3) checks whether there are any new Attribute/Value pairs, and if so, they are added to the indexes (step 1114).

In practice, checks (1) and (2) are performed together, by removing all records for that URL and rebuilding the index if the timestamp tag has been changed. However, if the timestamp is the same as the last time the URL was visited, it is assumed that there is nothing to update, and the index is not modified.

The difference between the "initial indexing" and "index updating" of RDL documents can be demonstrated by considering an example. For example, if 1 million data documents have never been indexed, the first time index database 804 is built for this document set, it will take a considerable amount of time: each document must be opened, parsed, and its elements, attributes and attribute values noted and recorded in database tables, such as the database tables that will be described in FIG. 9 below. This is an "initial indexing."

Suppose a month later, for example, the index database 804 is updated. Rather than processing the elements in all RDL documents, however, only the "timestamp" and "expiration" attributes of each RDL document is checked. It may be found that only 1,000 documents have changed. Accordingly, there is no need to update the index database 804 for all 1 million documents, but rather the index database 804 need only be updated for the documents that have changed.

In one embodiment, in accordance with the present invention, a RDL Document Type Definition (DTD) is used to define RDL data documents. The DTD is structured in a hierarchical tree structure of elements. Each element may include a list of attributes and/or an association with one or more sub-elements. The DTD specifies which attributes are required and which are optional for any embodiment of DTD. Depending on design constraints, the required and optional elements may vary. At highest level, the DTD has two elements descending from a root element (<rdmldoc>). The first element (<rdmldoc_header>) contains the metadata for the document as a whole and the second element (<line_item_set>) contains the set of the line items.

In one implementation consistent with the present invention, the <rdmldoc_header>element contains several attributes itself, and the optional sub-elements <data_source>, <formatting source>, <rdml_source>, <license_terms>, <link_set>, each describing some aspect of the source data. In this implementation, the <rdmldoc_header>element may include ten attributes describing document information as a whole. These attributes are "rdml_doc_ID" ""doc_title,38 "timestamp," "version,38 "expiration,38 "freqof___update,38 "num line items," "num_datapoints" ""x_indexes,38 and "first_Ii_with data."

The timestamp is typically generated by the application that created the document and may denote the time that the document was created or the time that the data was accessed for the creation of the document. The expiration describes the date and time that the data in the document may no longer be relied upon, typically when the next update is expected to be released. Freq_of update describes how frequently the document is updated and may be used by applications that want to schedule updates to the data. The above-mentioned parameters may be used by an application in updating index database 804.

Searching Process

Figure 12:
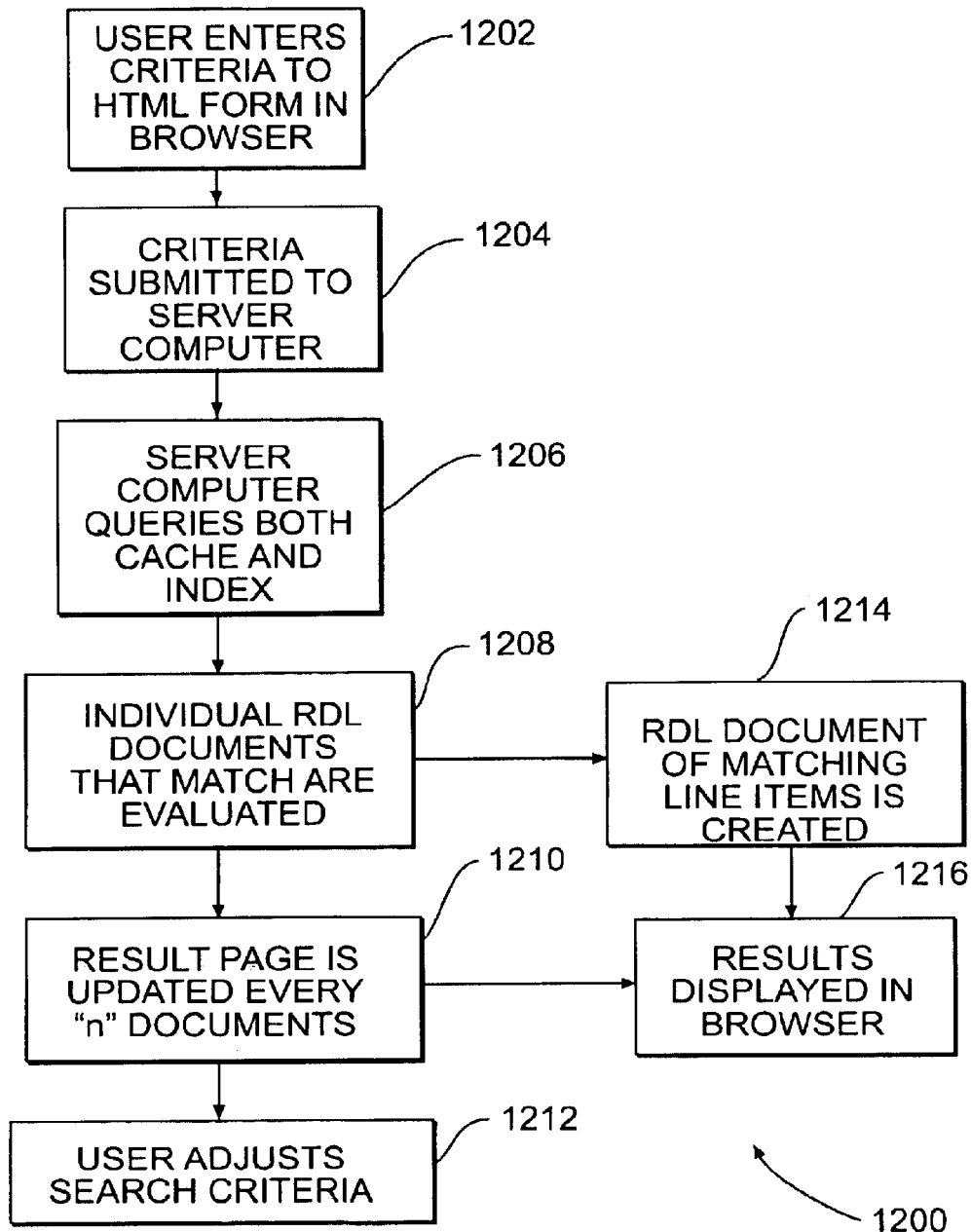
FIG. 12 depicts a flowchart of a searching process conducted by a web server depicted in FIG. 1 in accordance with the present invention.

FIG. 12 illustrates an overview of searching process that computer server 104 performs in accordance with the present invention. In this process, the user selects certain criteria and the computer server 104 collects the qualified results and formats them for display in various forms. The search process is the process that the user experiences when searching for information in a collection of RDL documents. In one implementation, this process is performed by the software components shown in FIG. 8.

Search process 1200 starts when the user enters a search criteria to an HTML form in a browser running on client computer 102 (step 1202). An exemplary version of this form is illustrated in the data query screen 202 of FIG. 3. This exemplary screen is one possible configuration in which all elements are not necessary. For example, an HTML form field of only text input can feed the subsequent search process. The data query screen 202 may be produced by a web server, or by an internal "client" program running on client computer 102.

Next, the search criteria from data query screen 202 is submitted typically to server computer 104 through a webserver 124, for example, via the GET or POST methods of HTTP (step 1204). GET and POST are two different methods in which information may be passed from a client browser to a web server using the HTTP protocol.

Once the web server 124 receives the search criteria, web server 124 queries both the cached RDL documents then reformats the request into an SQL string and submits the query to the index data tables 804 (step 1206).

When the submitted SQL string is located in the index data tables 804, the individual RDL documents that match the query are evaluated (step 1208). Evaluation consists of opening a file and transforming the document's data into a form that is directly comparable to the requested data. At this stage, the cached documents are also searched and evaluated.

As the individual documents are evaluated, search progress screen 214 is updated at predetermined intervals (step 1210). A search progress screen 214 is updated to show the search by making updates to this screen 214. As the user adjusts the query criteria, the query processor 802 adjusts its respective workload by adjusting the SQL string, and refining the query criteria (step 1212).

The result of a completed search may be an RDL document, constructed from the processed data returned by the SQL query and the user applied refinements (step 1214). The RDL document is returned to the user on search result screen 600, through a browser running on client computer 102 (step 1216).

Handling of Specific Topics

Data management system 100 in accordance with the present invention provides unique methods for the handling of specific topics in conducting and managing the queries of RDL documents, and formatting the results provided to the user. The following are examples of the various handling methods employed in accordance with the present invention.

Semantic Tags and Content Classification

Data management system 100 uses a number of semantic descriptors in the RDL documents and in the client computer 102 to identify documents by the meaning of their content. There are, first, "class" tags, where users can place identifying classification tags that help identify the subject matter of the document or line item. Each class identifier has two parts: a "namespace" and a "class". The two parts are separated by a semicolon (":"). The namespace is a unique identifier representing the source of that classification system. The "class" is the actual classification value, drawn from the specific vocabulary of the organization that sponsored the namespace.

For example, "dewey:8144" may mean that the subject of this document falls under section 8144 (French Literature) in the Dewey Decimal system. By another example, "sec:Total-Debt" may mean that this line item refers to total debt in a financial statement as defined by the SEC (Securities and Exchange Commission). The "Total-Debt" tag is specified as one of the tags of the U.S. Securities Exchange Commission's Standard Generalized Markup Language (SGML) standard. Aside from using specific class tags, data management system 100 may use other tags as an indirect way of identifying content. For example, the "li_units" tag might specify "US Dollars" as the unit measure of the line item. This could be interpreted by server computer 104 as an indicator that the data is of a "financial" nature. The user may specify maps from one element type to another in client computer 102. These elements and tags are described in U.S. patent application Ser. No. 09/573,778.

As described above, index database 804 is composed of "tags." Index database 804 may be larger or smaller, depending on the size of the potential index, and the importance of real-time seek performance. There are a number of items that may be indexed, for example, element names (what is found within the "< >"'s), element values (what is found between the "< >"'s), attribute names (what is found within the "< >"'s and before an "="), attribute values (what is found between the "< >"'s and after "="), and various types of metadata outside of the documents (e.g., number of hits, response time of server, downtime of server, etc.)

Although FIG. 10 shows an index with four (4) columns, other implementations may have different numbers of columns. Discussed below are three different implementations of an index table, each with a different set of tag type information. Note that attribute names and legend names are mixed together in the same column: there is no overlap between attribute and element names in RDL. One skilled in the art with XML experience will recognize that this efficiency can be relaxed to accommodate languages without this feature by adding an additional column called "tag type."

In one implementation, attribute names and values are recorded. This leads to the smallest index: easiest to create and fastest to search. To really test a query, however, requires going to the document in real time to test a complex query or to do a transformational test.

In a second implementation, a new column is populated: the line item ID number (also called the "anchor") and this allows a complete line item to be reconstructed from the index. This allows complex queries to be performed (eg., Units="$" AND Legend="Sales") because the query may match up attributes and values from the same line item.

In a third implementation, a new column is added: the parent line item of the current line item. This allows queries that move up and down the hierarchies of values in a document. An example of where hierarchical structure is important is in a financial statement: "Bus Sales" and "Auto Sales" may both be components of "Total Sales". To return a value for "SUM(Children of Total Sales>$350 million)", the query processor 802 finds the children of "Total Sales." This is performed by following the pointers in the "parent" column.

The method for determining the optimal index database 804 to use starts by considering the tradeoff between index keyword seek time and storage space, and real-time phase document seek time and query complexity. Because index database 804 may be created from a relational database (which is very fast), the largest architecture that can fit in the available storage space should be selected. However, it is important to remember that frequently-changing data (ie., documents which have expired according to their timestamps) are going to trigger a real-time document check. On the other hand, frequently changing data might suggest using one of the smaller index architectures.

On a small intranet or single-disk file system, for example, it may be possible to use a 5-column index. If millions of documents are being indexed around the web, many with infrequently changing data and complex arithmetic queries are not contemplated. In one implementation, a three-column index may be suitable dropping the "anchor" column and looking them up at runtime.

As mentioned above, in addition to elements and attributes, which are found within the documents themselves, there is information about the documents that is collected by the query processor 802 and the search servers themselves. This includes information about how quickly the document was returned, how many hits have previously been made, average number of times the source server was down, and how frequently users selected that document from a list of hits. Illustrated below is a sample of such information, which may be contained in index database 804. This information can be directly accessed for future searches by including them in index database 804.

| Exemplary Document Information in the Index Database | | |
|---|---|---|
| http://www.somedata.com/moredata.rdl | response_time | 3.5 |
| http://www.somedata.com/moredata.rdl | down_time | 14.3 |
| http://www.somedata.com/moredata.rdl | hits | 3893 |
| http://www.somedata.com/moredata.rdl | selections | 3.5 |

One skilled in the art of database development will recognize that elements, attributes and meta-document-data need not physically be in the same index table. Performance considerations may dictate splitting them into separate tables in different configurations.

Multiple Content Tags

Traditional SGML documents (and by extension, XML documents) place tag key-words in angle brackets ("<", ">") and use opening and closing tags to enclose a set of text. Thus, a fragment of a document may look like this:

<dewey:624>Some text here.<sec:Debt>43,000</sec:Debt><dewey:624>

Notice that, first of all, everything is repeated twice. Not only is this inefficient, but it limits the structure that the data and the tags are allowed to create because the relative locations and nesting of different items implies a sort of containership relationship that may or may not exist. Elements within RDL document would indicate the same information as follows:

<classes>dewey:624,sec:Debt</classes>

In the above language structure, the class information provides the necessary data, without causing the widespread nesting and restructuring of the data. The user of this RDL document simply has to specify the "classes" element, then use the commas that separate the different classes to parse the class element into the different member elements. In the example above, the two member elements are "dewey:624" and "sec:debt".

Compound Tags

Compound Tags are formed during the indexing phase to allow users to get the fully-qualified description of the line item they requested. This is necessary because much tabular data is necessarily hierarchical. Consider for example, the following table:

| | Sales | |
|---|---|---|
| Trucks | 456 | 489 |
| Autos | 231 | 219 |
| Buses | | |
| Single Deck | 112 | 98 |
| Double Deck | 159 | 167 |

If the query returned "Double Deck," the user would not know what that meant. A fully qualified version would be "Sales:Buses:Double Deck," which captures all of the textual components. It is the compound tag that is placed in the index; the select query doesn't look at the whole field, but can match the whole. Duplicates in such a select query are rejected so that the super-headings (or genuses) are not confused with the line item that contains the desired data. Accordingly, for reference purposes, "Single Deck" and "Double Deck" are considered species of the genus of "Buses". The "Buses" genus is also a species of the "Sales" genus. ("Trucks" and "Autos" are also species of the "Sales" genus.) (Alternately, the genus/species relationship can also be referred to herein as an object/sub-object relationship.)

In light of the aggregation of species of a genus, the system can implicitly generate any number of tags. The "Sales" genus implicitly includes tags such as "Sales:Implicit_Total", "Sales:Implicit_Average", "Sales:Implicit_Min", "Sales:Implicit_Max", and "Sales:Implicit_Count". As would be appreciated by one of ordinary skill other such aggregation tags can be similarly referenced, even for other compound tags. Thus, "Sales:Buses:Implicit_Total" is also a valid compound tag. Moreover, since line items can include multiple entries per line, an alternate implementation includes the ability individual columns of data from within the line item. For example, "Sales:Buses:Implicit_Total[1999]" "Sales:Buses:Implicit_Total[2000]" may be separately referenced. Relative indexing of rows and columns is also possible.

Real Time Searching

To perform real time searching in an efficient manner, data management system 100 keeps a database of content in its index databases 804, but then visits individual pages once a potential match has been found. Data management system 100 is thus able to ascertain (1) whether the page still exists, (2) whether the most up-to-date version of the data is contained in the index database 804, (3) whether new line items have been added that might meet the search criteria, and (4) whether complex internal criteria are met, such as "Revenues>100 million U.S. Dollars AND Debt<20 million French Francs."

Two-Step Searching Process

In one implementation of the present invention, balancing the indexing requirements of RDL documents, and the time it takes to check a specific document for purposes of value transformations during the search process involves managing a two-step process. The two search strategies (searching an index versus real time searching of the RDL documents) are two ends of a continuum.

As discussed above, conventional search engines on the web use an index-only search because there are too many documents to search in real time. In contrast, files on local disk drives are searched in real time because of the costs of building and maintaining index tables.

The searching approach of data management system 100, in accordance with the present invention, modulates the apportionment of the two approaches to provide the most efficient overall search combination. On the web, this means that the keywords, attribute names and attribute values (along with certain other aspects such as response time and downtime of servers) are placed in the index, but the transformed values and the actual documents are read and checked in real time. In contrast, in another implementation of the present invention, fewer attribute values may be placed in the index and more reliance may be place on real-time analysis of the documents.

Transformed Value Searches

Traditional search engines, and in fact traditional databases also, search for matches based on a character-by-character comparison of the search criteria with the target data. With semantic, numerical searches, however, this is not enough. It is necessary to determine whether an underlying quantity is the same. For example, "100 U.S. Dollars" may be the same as "87.5 Deutschmarks" and "91 ECUs" or "69 British Pounds." The data management system 100 can do quantitative searches based on transformed values by using a map of unit types and the "li_unit" attribute of the line item to test for equivalence. Transformed values can be used with all the major operators: "<", ">", "<=", ">=", "!", and "=". Value transformations are performed using the classification system that RDL documents use for unit types in one implementation.

FIG. 13 illustrates the unit types 1302 into which many units fall, the base units used for the unit types 1302, and other examples 1306 of possible base units that may be employed.

Figure 14:
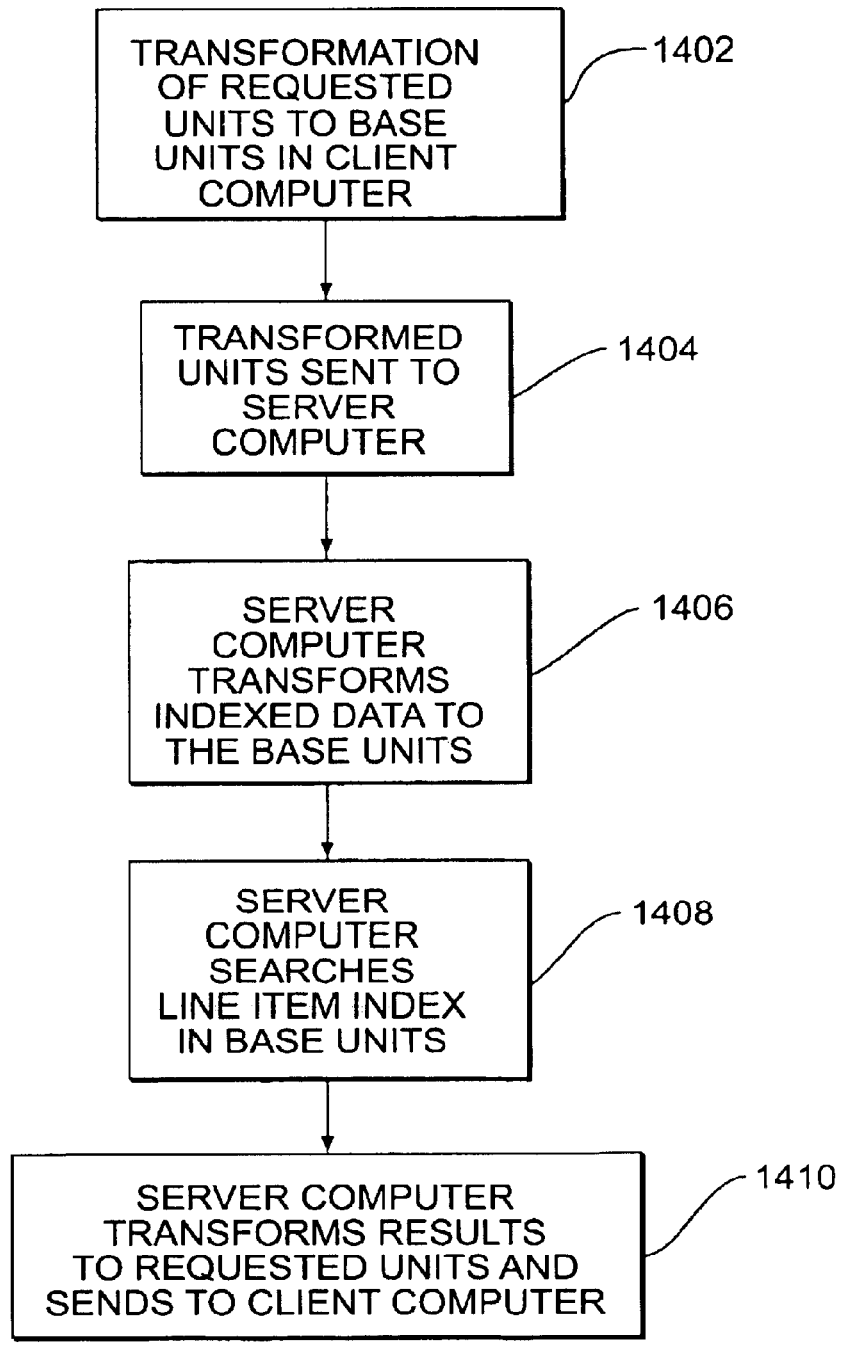
FIG. 14 depicts a flowchart of transformation value searches conducted by a web server depicted in FIG. 1 in accordance with the present invention.
Figure 15:
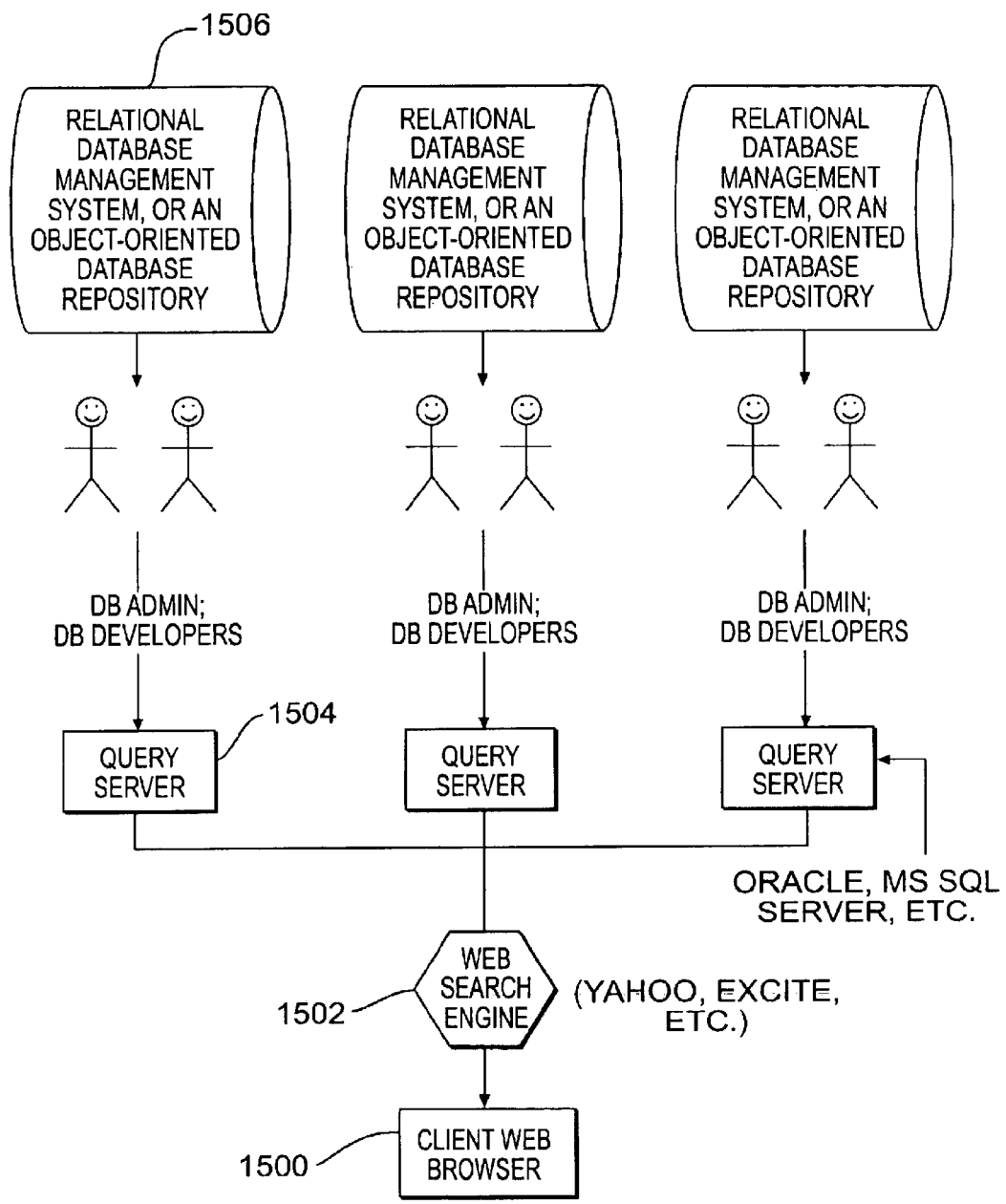
FIG. 15 depicts a web search engine using a multi-layer approach for searching data over the Internet.

FIG. 14 illustrates the flow of a transformation value search in accordance with the present invention. Database management system 100 maintains a database of conversion rates for use in transformational searches. The client computer 102 transforms the requested units to the base units 1304 (step 1402) before it is sent to the server computer (step 1404). The server computer, in turn, transforms the indexed data to the base units (step 1406). A search is then conducted in the base unit on the LineItemIndex database 902 (step 1408). The results are then transformed to the requested units and returned to the client computer 102 (step 1410).

The unit transformations used are kept in an XML document, a sample fragment of which appears below. Both the client computer 102 and the server computer 104 can modify this database of conversion factors to handle updates, such as updates to currency conversion rates, or the creation of new units by the user.

| Fragment of Unit Conversion Database |
|---|
| <?xml version="1.0" encoding="utf-8" ?><br><unitlist> |

| -continued |
|---|
| Fragment of Unit Conversion Database |
| <unit name="inch"><br>  <conversion><br>    conv_target = "centimeter"<br>    conv_factor = "2.5400050"<br>    conv_constant = ""<br>    conv_log = ""<br>    conv_source = "FGM"<br>    conv_href = ""><br>  </conversion><br>  <type>Length</type><br>  <subtype>Linear</subtype><br>  <plural>inches</plural><br>  <alias>in</alias><br>  <desc>Approximately the width of a man's thumb.</desc><br>  <icon href="inch.gif"></icon><br></unit><br><unit name="foot"><br>  <conversion><br>    conv_target = "meter"<br>    conv_factor = "0.30480060"<br>    conv_constant = ""<br>    conv_log = ""<br>    conv_source = "ISO"<br>    conv_href = ""><br>  </conversion><br>  <type>length</type><br>  <subtype>Linear</subtype><br>  <plural>feet</plural><br>  <alias>ft</alias><br>  <desc>Originally, the average length of a human foot</desc><br>  <icon href="foot.gif"></icon><br></unit> |

Note in particular the "type" element and the "subtype" elements. These allow the user to receive alternative measures in which to view data and results.

In addition to looking for the term that the user set as a query, data management system 100 may use a related-terms index (not shown) to find synonyms and similar concepts. The index for this step may be a many-to-many table that may contain two columns, each containing keywords. When a user specifies a keyword, this index (or "map") of related concepts is queried to find a list of related words. These terms are then fed into the SQL query to index database 804 as alternates. For example, one application for related-terms index is to map related foreign language words to each other.

Arithmetic Queries

The server computer 104 has access to an RXL Interpreter module, which converts a high level programming language to a low level Structured Query Language (SQL) code, so that it can perform arithmetic queries. These types of queries require using one or more line item(s) in an arithmetic formula to determine whether the subject line item meets a particular inclusion criteria.

A simple example would be a time series line item where the user is only interested in line items which contain a minimum % change (period to period) of 15%. The server computer 104 would retrieve a collection of line items that meet the non-arithmetic criteria (in this case, it is a time series), then passes each line item in a formula to the RX Interpreter for evaluation. In this case, the formula for evaluation would be "MAX(PERC_CHANGE(A))", where A is the line item being tested. The two capitalized words, MAX and PERC_CHANGE are functions in the RXL macro language. If this formula evaluates, for example, to 22%, the line item is added to the resultset. Arithmetic queries can use any RXL function, or RXL macro, that returns a value that can be evaluated to a scalar or a vector. For further details on macros, refer to U.S. patent application Ser. No. 09/573,780.

Watch Queries

Watch Queries may be queries that are set up to run on a scheduler, returning a result set when matches are found. This is a "pull" version of traditional "push" notification. For example, assume that a user wants to be notified when a certain stock hits a certain price from a given set of documents. A scheduler may be set to check those documents periodically. If the required tests are met, a specified result format may be sent (e.g., email message, or result table to browser, or notice to network software object).

This query method contrasts with the usual method of setting a trigger on a relational database that watches updates and sends a message ("push") at the instant the change occurs. The downside of this approach is the necessity of placing a trigger in the software on the server and the burden placed on the server.

Cost-Based Searches

The RDL and RXL document type definitions include elements that describe the licensing terms of the document. The server computer 104 can read these elements (they may appear in the LineItemIndex table 902) to determine whether they meet any licensing criteria that the user has set as part of the search. A sample fragment of a licensing element from an RDL document follows.

---

Fragment of Licensing Element of an RDL / RMML Document

---

```
<license_terms
    copyright_cite = "Copyright 1998, RDL, Inc. All Rights Reserved"
    holder = "RDL, Inc."
    license_type = "Payment Per Download"
    warranty = "No warranty is expressed or implied. Use this data at your own risk."
    disclaimer = "This data is provided 'as-is'. The provider assumes no responsibility for its use or misuse."
        terms = "1.00 US Dollar"
        date = "1999.0123000000.00"
        email = "license@RDL.com"
        href = "http://www.RDL.com"
        state = "MD"
        country = "USA">
<contact_info
        role = "RDLDoc Source"
        name = "Russell T. Davis"
        company = "RDL, Inc."
        address = "2 Wisconsin Circle, Suite 700"
        city = "Chevy Chase"
        state = "MD"
        zip = "20815"
        country = "USA"
        email = "rt_davis@sprynet.com"
        xlink:form = "simple"
        href = "http://www.RDL.com"
        comments = "">
</contact_info>
</license_terms>
```

---

The server computer 104 can search for documents using any of these criteria. For example, if the user has set a maximum amount that can be paid of "$2.5 U.S. Dollars Per Download." This particular document defined by the above fragment would be included in the results because it has a "license_type" of payment per download, and a "terms" of less than $2.50.

Note that RDL is a particular implementation of XML which provides elements and attributes that describe the "metadata" of numbers as well as the numbers themselves. Those who are familiar with XML will recognize that the methods of the search engine described herein may be applied to any XML-based implementation that provides elements and attributes that supply equivalent information.

The foregoing description of an implementation of the invention has been presented for purposes of illustration and description. It is not exhaustive and does not limit the invention to the precise form disclosed. Modifications and variations are possible in light of the above teachings or may be acquired from practicing the invention.

For example, the described implementation includes software but methods and systems consistent with the present invention may be implemented as a combination of hardware and software or in hardware alone. Methods and systems in accordance with the present invention may be implemented with both object-oriented and non-object-oriented programming systems. Additionally, components in accordance with the present invention may be stored in memory; one skilled in the art will appreciate that these components can be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method for processing transformational queries on data, comprising:

accessing an index of numerical data items originating from source documents, wherein the numerical data items are tagged and the tags associated with the indexed numerical data items reflect a context of the numerical data items in the source documents;

selecting tagged numerical data items in the index to form a resultant data set responsive to a query, wherein the tagged numerical data items in the index are updated by storing a search criterion, a frequency parameter, and an expiration parameter, and using the frequency parameter to poll a document with the search criterion for a time determined by the expiration parameter to retrieve tagged numerical data items for updating the index;

formatting the resultant data set from the selected tagged numerical data items, transforming when necessary select tagged numerical data items in the resultant data set for consistent presentation of all numerical data items in the resultant data set, based on the tags associated with the located tagged numerical data items; and making the formatted resultant data set available to a user.

2. The method of claim 1, wherein selecting tagged numerical data items in the index includes querying the index based on a plurality of tags and attributes associated with the tagged numerical data items.

3. The method of claim 2, wherein the plurality of tags include tags that define the characteristics of a document.

4. The method of claim 2, wherein the tags that define characteristics of the document are identified as specific element attribute values, which allow characteristics of a document to be interpreted as they appear in the source documents.

5. The method of claim 1, wherein selecting tagged numerical data items from the index includes querying the index based on semantic numerical searches.

6. The method of claim 5, wherein querying the index based on the semantic numerical searches includes using a map of unit types and an attribute of a line item to test for equivalence.

7. The method of claim 1, wherein selecting tagged numerical data items includes querying the index based on an arithmetic query on the tagged numerical data items.

8. The method of claim 7, wherein querying the index based on the arithmetic query is performed by:
identifying line items that meet a specified criterion;
evaluating a percent change for each of the identified line items; and
setting a reference for each of the identified line items that meets the specified criterion.

9. The method of claim 1, wherein the selecting is based on cost.

10. The method of claim 9, wherein if the cost of selecting tagged numerical data items exceeds a predetermined amount, one or more of the tagged numerical data items are not included in when forming the resultant data set.

11. The method of claim 9, wherein if the cost of the tagged numerical data items exceeds a predetermined amount, a minimal amount of the tagged data numerical items is included in the resultant data set and a notation of the cost for additional tagged numerical data items are made available to the user.

12. The method of claim 1, wherein selecting tagged numerical data items includes using a query based on an author of a document, a formatter of the document, or a collector of the document.

13. The method of claim 12, wherein using the query further includes using the author, the formatter, or collector of the document to watch the resultant data set as it is formatted.

14. The method of claim 1, wherein formatting the resultant data set includes assembling tagged numerical data items retrieved from line items found within a plurality of documents.

15. The method of claim 1, further comprising creating the index by employing a plurality of servers to collect the tagged numerical data items, the plurality of servers being capable of passing queries between each other to combine tagged numerical data items in remote documents.

16. The method of claim 1, further comprising transforming the resultant data set from a first unit standard to a second unit standard.

17. A data processing method for processing transformational queries on numerical data, comprising:
accessing an index of numerical data items originating from source documents, wherein the numerical data items are tagged and the tags associated with the indexed numerical data items reflect a context of the numerical data items in the source documents;
locating tagged numerical data items in the index to form a resultant data set responsive to a query, wherein the tagged numerical data items in the index are updated by storing a search criterion, a frequency parameter, and an expiration parameter, and using the frequency parameter to poll a document with the search criterion for a time determined by the expiration parameter to retrieve tagged numerical data items for updating the index;
formatting the resultant data set from the located tagged numerical data items, ensuring that tagged numerical data items in the resultant data set are formatted consistently based on the tags associated with the located tagged numerical data items; and
making the formatted resultant data set available to a user, wherein when a resultant data set includes two or more numerical data items related based on corresponding tags for these numerical data items, resetting at least one of the numerical data items in the resultant data set such that presentation of the two or more numerical data items is not substantially different.

18. The method of claim 17, wherein locating tagged numerical data items in the index includes querying the index based on a plurality of tags and attributes associated with the tagged numerical data items.

19. The method of claim 18, wherein the plurality of tags include tags that define the characteristics of a document.

20. The method of claim 18, wherein the tags that define characteristics of a document are identified as specific element attribute values, which allow characteristics of the document to be interpreted as they appear in the source documents.

21. The method of claim 17, wherein locating tagged numerical data items from the index includes querying the index based on semantic numerical searches.

22. The method of claim 21, wherein querying the index based on semantic numerical searches includes using a map of unit types and an attribute of a line item to test for equivalence.

23. The method of claim 17, wherein the step of locating tagged numerical data items includes querying the index based on an arithmetic query on the tagged numerical data items.

24. The method of claim 23, wherein querying the index based on an arithmetic query is performed by:
identifying line items that meet a specified criterion;
evaluating a percent change for each of the identified line items; and
setting a reference for each of the identified line items that meets the specified criterion.

25. The method of claim 17, wherein the locating is based on cost.

26. The method of claim 25, wherein if the cost of selecting tagged numerical data item exceeds a predetermined amount, one or more of the tagged numerical data items are not included when forming the resultant data set.

27. The method of claim 25, wherein if the cost of the tagged numerical data items exceeds a predetermined amount, a minimal amount of the tagged data numerical items is included in the resultant data set and a notation of the cost for additional tagged numerical data items is made available to the user.

28. The method of claim 17, wherein locating tagged numerical data items includes using a query based on an author of a document, a formatter of the document, or a collector of the document.

29. The method of claim 28, wherein using the query further includes using the author, the formatter, or the collector of the document to watch the resultant data set as it is formatted.

30. The method of claim 17, wherein building the resultant data set includes assembling tagged numerical data items retrieved from line items found within a plurality of documents.

31. The method of claim 17, further comprising creating the index by employing a plurality of servers to collect the tagged numerical data items, the plurality of servers being capable of passing queries between each other to combine tagged numerical data items in remote documents.

32. The method of claim 17, further comprising transforming the resultant data set from a first unit standard to a second unit standard.

33. A data processing method for processing transformational queries on numerical data, comprising:
accessing an index of numerical data items originating from source documents, wherein the numerical data items are tagged and the tags associated with the indexed numerical data items reflect a context of the numerical data items in the source documents;

locating tagged numerical data items in the index to form a resultant data set responsive to a query, wherein the tagged numerical data items in the index are updated by storing a search criterion, a frequency parameter, and an expiration parameter, and using the frequency parameter to poll a document with the search criterion for a time determined by the expiration parameter to retrieve tagged numerical data items for updating the index;

formatting the resultant data set from the located tagged numerical data items, ensuring that tagged numerical data items in the resultant data set are formatted consistently based on the tags associated with the located tagged numerical data items; and making the formatted resultant data set available to a user, wherein when a resultant data set includes a first numerical data item different by a factor of ten from other numerical data items in the resultant, resetting the first numerical data item to be consistent with the presentation of the other numerical data items in the resultant data set.

34. The method of claim 33, wherein locating tagged numerical data items in the index includes querying the index based on a plurality of tags and attributes associated with the tagged numerical data items.

35. The method of claim 34, wherein the plurality of tags include tags that define the characteristics of a document.

36. The method of claim 34, wherein the tags that define the characteristics of the document are identified as specific element attribute values, which allow characteristics of the document to be interpreted as they appear in the source documents.

37. The method of claim 33, wherein locating tagged numerical data items from the index includes querying the index based on semantic numerical searches.

38. The method of claim 37, wherein querying the index based on semantic numerical searches includes using a map of unit types and an attribute of a line item to test for equivalence.

39. The method of claim 33, wherein locating tagged numerical data items includes querying the index based on an arithmetic query on the tagged data items.

40. The method of claim 39, wherein querying the index based on an arithmetic query is performed by:

identifying line items that meet a specified criterion;

evaluating a percent change for each of the identified line items; and setting a reference for each of the identified line items that meets the specified criterion.

41. The method of claim 33, wherein the locating is based on cost.

42. The method of claim 41, wherein if the cost of locating tagged numerical data items exceeds a predetermined amount, one or more of the tagged numerical data items are not included when forming the resultant data set.

43. The method of claim 41, wherein if the cost of the tagged numerical data items exceed a predetermined amount, a minimal amount of the tagged data numerical items is included in the resultant data set and a notation of the cost for additional tagged numerical data items is made available to the user.

44. The method of claim 33, wherein the step of locating tagged numerical data items includes using a query based on an author of a document, a formatter of the document, or a collector of the document.

45. The method of claim 44, wherein using the query further includes using the author, the formatter, or the collector of the document to watch the resultant data set as it is formatted.

46. The method of claim 33, wherein formatting the resultant data set includes assembling tagged numerical data items retrieved from line items found within the source documents.

47. The method of claim 33, further comprising creating the index by employing a plurality of servers to collect the tagged numerical data items, the plurality of servers being capable of passing queries between each other to combine tagged numerical data items in remote documents.

48. The method of claim 33, further comprising transforming the resultant data set from a first unit standard to a second unit standard.

* * * * *